US012205177B2

(12) United States Patent
Sami et al.

(10) Patent No.: US 12,205,177 B2
(45) Date of Patent: Jan. 21, 2025

(54) SYSTEMS AND METHODS FOR AUTOMATICALLY GENERATING, SCHEDULING, POSTING, AND RECYCLING SOCIAL MEDIA POSTS USING ARTIFICIAL INTELLIGENCE

(71) Applicant: HighLevel Inc., Dallas, TX (US)

(72) Inventors: Narayana Sami, Coimbatore (IN); Pooja Sanandia, Kitchener (CA); Ayush Chaurasia, Ahmedabad (IN); Dhairya Singh Raghav, Noida (IN); Hardik Bhatt, Noida (IN); Mayur Takawale, Pune (IN); Rohit Haldar, Mumbai (IN)

(73) Assignee: HighLevel Inc., Dallas, TX (US)

( * ) Notice: Subject to any disclaimer, the term of this patent is extended or adjusted under 35 U.S.C. 154(b) by 42 days.

(21) Appl. No.: 18/341,261

(22) Filed: Jun. 26, 2023

(65) Prior Publication Data

US 2024/0428345 A1 Dec. 26, 2024

(51) Int. Cl.
*G06Q 50/00* (2012.01)
*G06Q 30/0251* (2023.01)
(52) U.S. Cl.
CPC ......... *G06Q 50/01* (2013.01); *G06Q 30/0254* (2013.01)
(58) Field of Classification Search
CPC ..... G06Q 50/01; G06Q 30/0254; G06N 20/00
See application file for complete search history.

(56) References Cited

U.S. PATENT DOCUMENTS 10,074,102 B2 9/2018 N et al.
11,106,877 B2 8/2021 Hewitt et al.
(Continued)

FOREIGN PATENT DOCUMENTS

WO WO-2024167651 A1 * 8/2024 ......... G06F 3/04812

OTHER PUBLICATIONS

Wu Huanqin, Ma Baijiaxin, Liu Wei, Chen Tao, Nie Dan, Fast and Constrained Absent Keyphrase Generation by Prompt-Based Learning, Jun. 2022, Proceedings of the AAAI Conference on Artificial Intelligence, vol. 36, No. 10, pp. 11495-11503 (Year: 2022).*
(Continued)

*Primary Examiner* — E Carvalho
(74) *Attorney, Agent, or Firm* — Aambell PC

(57) ABSTRACT

Embodiments of a method for automatically generating, scheduling, posting, and recycling social media posts are disclosed, the method comprising: requesting an artificial intelligence (AI) engine for a plurality of prompts to create a social media post on a social media platform; selecting one prompt in the plurality of prompts returned by the AI engine; requesting the AI engine for social media post content based on the selected prompt; selecting a textual content and a non-textual content; combining the selected textual content and the selected non-textual content according to pre-configured settings to create one social media post; repeating selecting the textual content and the non-textual content and combining, to create a plurality of social media posts; generating a schedule for each one in the plurality of social media posts; and automatically posting each one in the plurality of social media posts on the social media platform according to the schedule.

20 Claims, 13 Drawing Sheets

(56) References Cited

U.S. PATENT DOCUMENTS

| | | | |
|---|---|---|---|
| 11,586,415 B1 | | 2/2023 | Schreier et al. |
| 11,778,279 B2 * | 10/2023 | Olabode | H04N 21/4788 |
| | | | 725/14 |
| 2018/0374253 A1 * | 12/2018 | Yu | G06T 15/005 |
| 2021/0224858 A1 * | 7/2021 | Khoury | G06Q 30/0276 |
| 2022/0277344 A1 * | 9/2022 | Chen | G06F 40/30 |
| 2023/0229288 A1 * | 7/2023 | Sicora | G06F 3/0482 |
| | | | 715/764 |

OTHER PUBLICATIONS

Ellen Jiang, Kristen Olson, Edwin Toh, Alejandra Molina, Aaron Donsbach, Michael Terry, Carrie J Cai, PromptMaker: Prompt-based Prototyping with Large Language Models, Apr. 28, 2022 , CHI '22 Extended Abstracts: CHI Conference on Human Factors in Computing Systems Extended, No. 35, pp. 1-8 (Year: 2022).*
10 Best AI Tools for Social Media (May 2023), United IA, 11 pages.

* cited by examiner

SYSTEMS AND METHODS FOR AUTOMATICALLY GENERATING, SCHEDULING, POSTING, AND RECYCLING SOCIAL MEDIA POSTS USING ARTIFICIAL INTELLIGENCE

TECHNICAL FIELD

The present disclosure relates to systems, techniques, and methods directed to automatically generating, scheduling, posting, and recycling social media posts using artificial intelligence.

BACKGROUND

Artificial intelligence (AI) is a growing field in computer science that uses machine learning models to make predictions, recommendations, or classifications based on input data. Revenue from the AI software market worldwide is expected to reach 126 billion dollars by 2025 according to some estimates. In some domains, such as marketing, AI has the potential to deliver highly targeted and personalized advertisements using behavioral analysis, pattern recognition, and other learning algorithms.

BRIEF DESCRIPTION OF THE DRAWINGS

Embodiments will be readily understood by the following detailed description in conjunction with the accompanying drawings. To facilitate this description, like reference numerals designate like elements. Embodiments are illustrated by way of example, and not by way of limitation, in the figures of the accompanying drawings.

DETAILED DESCRIPTION

Overview

Figure 1:
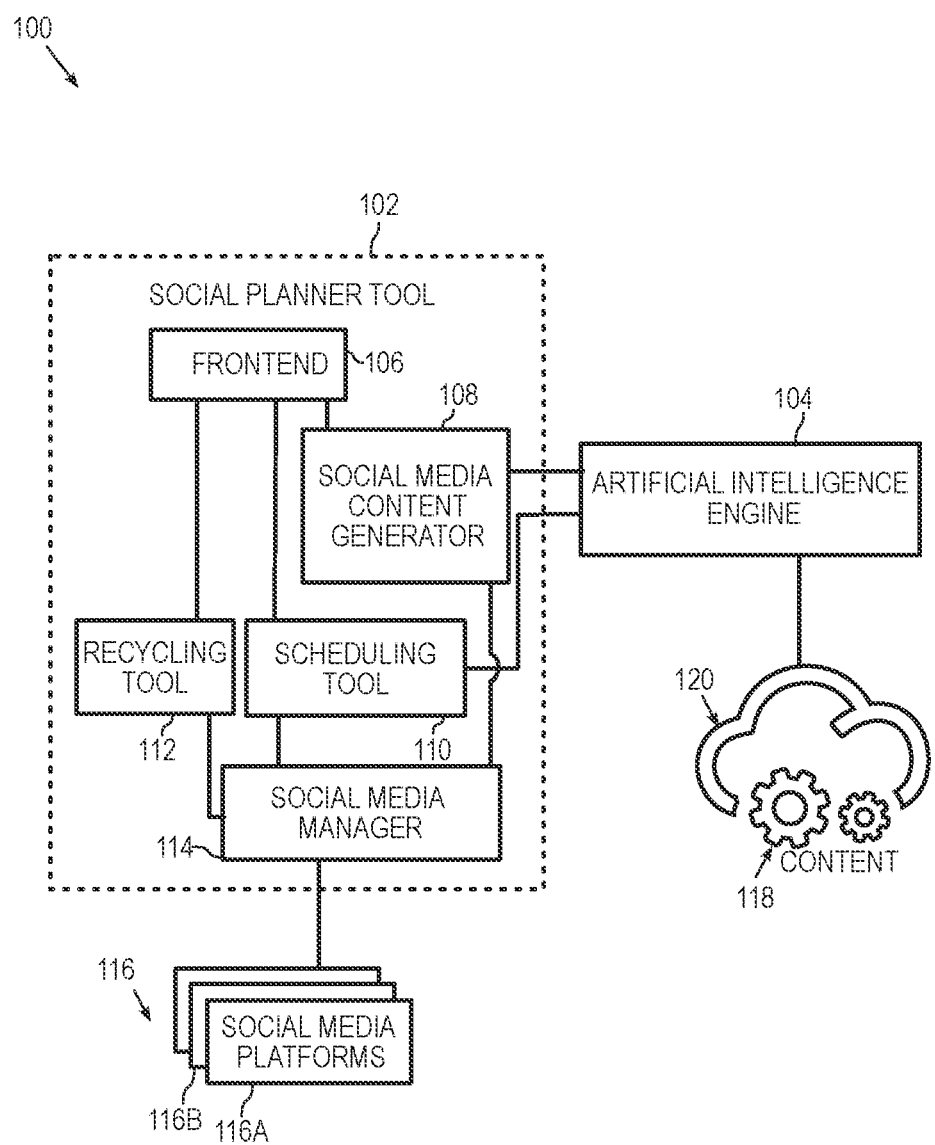
FIG. 1 is a simplified block diagram illustrating a system for automatically generating, scheduling, posting, and recycling social media posts using AI, according to some embodiments of the present disclosure.

For purposes of illustrating the embodiments described herein, it is important to understand certain terminology and operations of blockchain networks. The following foundational information may be viewed as a basis from which the present disclosure may be properly explained. Such information is offered for purposes of explanation only and, accordingly, should not be construed in any way to limit the broad scope of the present disclosure and its potential applications.

AI uses machine learning models to make predictions, recommendations, and classifications. In general, machine learning models use algorithms to parse data, learn from the parsed data, and make informed decisions based on what it has learnt. According to some classifications, deep learning models are subsets of machine learning models, being machine learning algorithms that operate in multiple layers, creating an artificial neural network. According to some other classifications, machine learning models are those that rely on human intervention to learn, whereas deep learning models automatically learn without human intervention. Because the learning algorithms per se are more relevant to the disclosure herein than any human intervention to provide training data, the former classification is employed herein, such that wherever "machine learning models" or "machine learning algorithms" is used, it is intended that deep learning models are included as well.

AI algorithms are used in marketing to make automated decisions about marketing efforts based on data collection from observation of target consumers, economic trends, and market movements. AI significantly aids in marketing's core activities of understanding customer needs, matching them to products and services, and persuading people to buy. Many marketing firms now use AI to handle tasks such as digital ad placement, sales forecasts, and customer service. In a general sense, marketing AI can be categorized into standalone applications (e.g., separate from standard marketing and sales channels, and visible to customers) and integrated applications (e.g., embedded within existing systems and typically not visible to customers). Despite their growing use, AI tends to be used most frequently for routine tasks rather than creative endeavors. Enhancements in generative AI algorithms have made possible creative writing and art using AI. AI engines geared for generating textual content and image or video content are available for the general public today. For example, Rytr™, ChatGPT™, etc.

can be used to generate textual content. GetIMG™, Night-Cafe™, Dall-E™, etc. can be used to generate image content.

Some such AI tools are used to generate content for social media platforms as an important part of digital and e-marketing strategies. As the use of social media trends upwards, marketers are perfecting strategies to capture significant competitive advantage through engagement with users of various social media platforms. Today, businesses manage their social media posts manually, from researching relevant content, to creating original posts, designing or sourcing images, and scheduling posts at appropriate times. With different rules for social media posts on different social media platforms, this process can be time-consuming and can use up significant resources, particularly for businesses with a large social media presence on multiple social media platforms. Additionally, businesses would need to monitor user engagement and adjust their strategy based on feedback received. Overall, marketing across social media platforms, while important and necessary for many businesses, can consume large amounts of time and resources.

Although various AI tools purport to generate social media content for marketing purposes, they mostly create taglines, hashtags, icons, templates, or content ideas for a human creative writer, who actually generates the bulk of the content according to the various rules for different social media platforms. Some social media AI tools allow scheduling as part of social media project management but require a human operator to perform the task of posting. Many AI tools focus on analytics, extracting post insights from social media platforms, or recommending ad placement based on the analytics. Thus, currently available AI tools only facilitate a human operator to post social media content according to a suitable schedule, reducing some human time and resources; however, human operators continue to generate new social media posts, post already generated posts, or redo old posts based on user analytics.

In contrast, embodiments of the system disclosed herein facilitate automatically generating, scheduling, posting, and recycling social media posts using AI without intervention by a human operator. A social planner tool as disclosed herein may generate high-quality social media posts tailored to the user's business needs, ensuring consistency in brand messaging and visual identity across multiple social media platforms. The social planner tool may automate the entire process, saving businesses costs associated with hiring dedicated staff for social media management or with outsourcing the task to a third-party agency. In some embodiments, the social planner tool may suggest a schedule for recycling posts, ensuring that businesses stay top-of-mind with their audience and improving engagement rates over time. The system may be user-friendly and may require minimal input from a human operator, making it accessible to businesses of all sizes and levels of technical expertise. Overall, the automation of social media posts as described herein can help businesses streamline their social media strategy, improve engagement, and save time and costs associated with manual management.

In various embodiments, the social planner tool's user may provide basic information about their business, such as their target audience, products or services, and marketing goals. In some embodiments, a chatbot may be used to ask for information and/or receive information from the user. Using AI Application Programming Interfaces (APIs), the chatbot may use natural language processing and machine learning algorithms to understand the user's business needs and generate prompts to fetch relevant content from various sources. The system may generate a matching image using an AI engine for image generation, such as DALL-E™ for each social media post. In some embodiments, the system may post the social media content on the appropriate social media platforms and schedule the recycling of the posts for future dates, based on an automatically generated schedule.

The system may also send social media posts to the user for review, allowing the user to make any adjustments or provide feedback. The content may be provided on a user-friendly frontend for ease of review and feedback, allowing for easy adjustments and customization. The system may be configured to post content automatically unless the user intervenes, so that social media posts may be automatically generated and posted based on scheduled dates unless the user chooses to stop posting. In some embodiments, the system may seamlessly integrate various applications to automate the process of creating, scheduling, posting, and recycling social media content for businesses, saving them time and resources while improving engagement and brand consistency. The system may improve engagement rates and brand consistency for businesses on various social media platform, for example, by suggesting the best times for posting and recycling content and generating high-quality social media posts tailored to the user's business needs. The system can facilitate efficient, intelligent, visually appealing, effective, and user-friendly social media management.

In the following detailed description, various aspects of the illustrative implementations may be described using terms commonly employed by those skilled in the art to convey the substance of their work to others skilled in the art.

The term "connected" means a direct connection (which may be one or more of a communication, mechanical, and/or electrical connection) between the things that are connected, without any intermediary devices, while the term "coupled" means either a direct connection between the things that are connected, or an indirect connection through one or more passive or active intermediary devices.

The term "computing device" means a server, a desktop computer, a laptop computer, a smartphone, or any device with a microprocessor, such as a central processing unit (CPU), general processing unit (GPU), or other such electronic component capable of executing processes of a software algorithm (such as a software program, code, application, macro, etc.).

The term "cloud network" means a network of computing devices coupled together in a public, private, or hybrid communications network. Communication in the cloud network may use one or more wired, wireless, broadband, radio, and other kinds of communicative means. The Internet is an example of a cloud network. A subset of the computing devices in the cloud network may be employed in the blockchain network, for example, to participate in and/or validate transactions of the blockchain.

The description uses the phrases "in an embodiment" or "in embodiments," which may each refer to one or more of the same or different embodiments.

Although certain elements may be referred to in the singular herein, such elements may include multiple sub-elements. For example, "a computing device" may include one or more computing devices.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

Note that the vocabulary of AI technology includes human-centric words such as "intent," "reason," "plan," "learn," "infer," "strategize," "create," etc. To practitioners in the field, and as used herein, these terms have specific meanings relating to particular software methods, algorithms, and functionalities, such as searching, parsing, applying heuristic analysis, executing a neural network process, optimizing a particular function, etc., which are only roughly correspondent to their commonsense meanings. The use of these words in no way suggests that a human is performing the actions; rather they refer to software code executed by processing circuitry to perform specific functions.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The accompanying drawings are not necessarily drawn to scale. In the drawings, same reference numerals refer to the same or analogous elements shown so that, unless stated otherwise, explanations of an element with a given reference numeral provided in context of one of the drawings are applicable to other drawings where element with the same reference numerals may be illustrated. Further, the singular and plural forms of the labels may be used with reference numerals to denote a single one and multiple ones respectively of the same or analogous type, species, or class of element.

Note that in the figures, various components are shown as aligned, adjacent, or physically proximate merely for ease of illustration; in actuality, some or all of them may be spatially distant from each other. In addition, there may be other components, such as routers, switches, antennas, communication devices, etc. in the networks disclosed that are not shown in the figures to prevent cluttering. Systems and networks described herein may include, in addition to the elements described, other components and services, including network management and access software, connectivity services, routing services, firewall services, load balancing services, content delivery networks, virtual private networks, etc. Further, the figures are intended to show relative arrangements of the components within their systems, and, in general, such systems may include other components that are not illustrated (e.g., various electronic components related to communications functionality, electrical connectivity, etc.).

In the drawings, a particular number and arrangement of structures and components are presented for illustrative purposes and any desired number or arrangement of such structures and components may be present in various embodiments. Further, unless otherwise specified, the structures shown in the figures may take any suitable form or shape according to various design considerations, manufacturing processes, and other criteria beyond the scope of the present disclosure.

Figure 11:
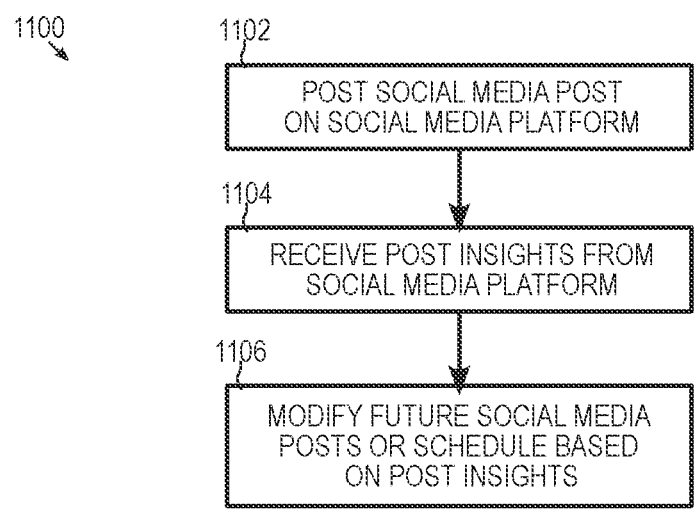
FIG. 11 is a simplified flow diagram illustrating yet other example operations associated with a system for automatically generating, scheduling, posting, and recycling social media posts using AI, according to some embodiments of the present disclosure.

For convenience, if a collection of drawings designated with different letters are present (e.g., FIGS. 11A-11G), such a collection may be referred to herein without the letters (e.g., as "FIG. 11"). Similarly, if a collection of reference numerals designated with different letters are present (e.g., 106a, 106b), such a collection may be referred to herein without the letters (e.g., as "106") and individual ones in the collection may be referred to herein with the letters. Further, labels in upper case in the figures (e.g., 106A) may be written using lower case in the description herein (e.g., 106a) and should be construed as referring to the same elements.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

EXAMPLE EMBODIMENTS

FIG. 1 is a simplified block diagram illustrating an example system 100 comprising a social planner tool 102 coupled to an AI engine 104. Social planner tool 102 includes a frontend 106, a social media content generator 108, a scheduling tool 110, a recycling tool 112, and a social media manager 114. In various embodiments, social media content generator 108 and scheduling tool 110 may interface with AI engine 104 through a suitable AI API. Social planner tool 102 may interface with one or more social media platforms 116. AI engine 104 may access content 118 in a cloud network 120. In various embodiments, content 118 includes textual content, such as bulk text, hashtags, etc. and non-textual content, such as icons, still images, video, animations, audio, etc.

In some embodiments, frontend 106 may be provisioned in a computing device separate from one or more computing devices provisioned with the remaining components of social planner tool 102. In other embodiments, frontend 106 may be provisioned in the same computing device as other components of social planner tool 102. In some embodiments, the computing device provisioned with at least a portion of social planner tool 102 may comprise a server in cloud network 120. AI engine 104 may be external software (i.e., external to social planner tool 102 so as to be accessed non-natively through a suitable API or owned or operated by a different owner than the owner that controls social planner tool 102) in some embodiments. In other embodiments, AI engine 104 may be integrated into social planner tool 102 suitably, for example, in an appropriate container, function block, etc.

In various embodiments, frontend 106 may receive inputs from a human user (not shown) regarding various business marketing needs, business niche, target audience, geographic locations for advertising, desired social media platforms 116, and other such data. The input received at frontend 106 may be indicative of at least (a) the social media platform for the social media post, (b) a business niche targeted by the social media post, and (c) a geographic location of an audience targeted by the social media post. The input may further include customer engagement rates and business needs for various days. The input may also include specific dates and times for posting the social media posts.

In various embodiments, the input may be saved as (e.g., included into) configuration settings. The configuration settings may also include attributes specific to different social media platforms 116. For example, the configuration settings for social media platform 116*a* may include "profiles", "stories," etc. specific thereto; configuration settings for social media platform 116*b* may include different attributes such as "reels," "photos," etc. specific thereto; and so on. The configuration settings may be saved separately for the different social media platforms 116 in some embodiments. In other embodiments, the configuration settings for all social media platforms 116 may be saved together in a database or other suitable data store with appropriate metadata, field variables etc. to allow differentiation therebetween.

Social media platforms 116 may be associated with separate social media platform rules for posting social media posts using the relevant attributes. For example, social media platform 116*a* may include rules for generating profiles, groups, etc., and posting stories, sharing stories, etc. Social media platform 116*b* may include other rules for generating reels, posting photos, sharing photos, etc. The rules may specify word count, character limits, image resolutions, etc. specific to the respective social media platforms 116. The rules may further include dates and times when social media posts may be posted to generate greater traffic than during other times. The rules may be obtained from the respective social media platforms 116. Rules associated with social media platform 116*a* may be different from rules associated with social media platform 116*b*.

The input received at frontend 106 may form the basis for seed data to AI engine 104. In some embodiments, the input may be directly used for seed data; in other embodiments, the input may be saved as configuration settings, from which seed data may be derived. In various embodiments, social media content generator 108 may request AI engine 104 for a plurality of prompts to create a social media post on a particular one 116*a* of social media platforms 116 using a portion of the received input as seed data.

Merely as an example and not as a limitation, consider that a human user provides as input, information indicating that a business providing plumbing services wants to publish social media posts on particular social media platforms 116 targeting homeowners in a certain City A. Frontend 106 may provide the information to social media content generator 108. Social media content generator 108 may send the information as seed data to AI engine 104 with a request such as "generate prompts for social media posts targeting customers of plumbing services in City A". AI engine 104 may analyze the seed data using suitable AI algorithms and return a plurality of prompts as requested. Social media content generator 108 may select one prompt in the plurality of prompts returned by AI engine 104. Returning to the example of the plumbing services business, the selected prompt may be (by way of example only), "fast and timely plumbing services."

Social media content generator 108 may request AI engine 104 for social media post content based on the selected prompt. The social media post content may comprise a plurality of textual content (e.g., bulk text, hashtags, keywords, etc.) and another plurality of non-textual content (e.g., icons, animations, images, video, audio, etc.) based on the selected prompt. For example, the prompt, "fast and timely plumbing services" may be sent to AI engine 104 with a request to generate social media content for Twitter™. AI engine 104 may appropriately take into consideration the word limit on textual content in Twitter™ and return a plurality of textual content with the appropriate word limit. AI engine 104 may also return another plurality of images related to plumbing services, and/or indicative of "fast services" and/or "timely services." The textual content and non-textual content may be retrieved from content 118 in cloud network 120.

Social media content generator 108 may select a particular one of the textual content returned by AI engine 104 and another one or more of the non-textual content returned by AI engine 104. For example, a subset of images from the plurality of non-textual content may be selected based on semantic association with the selected textual content. In some embodiments, social media content generator 108 may first select the textual content and then send a request to AI engine 104 to generate non-textual content based the selected textual content, the request comprising prompts selected from the textual content (e.g., by parsing the textual content appropriately). In many embodiments, the semantic analysis to correlate the textual content and non-textual content may include lexical semantic analysis and compositional semantic analysis as desired and based on particular needs. The compositional semantic analysis may include word sense disambiguation and relationship extraction appropriately.

Thereafter, social media content generator 108 may select one or more images from the returned plurality of non-textual content, the selection based on semantic association with the remainder of the textual content not provided in the prompts to AI engine 104 (e.g., semantic association with the textual content provided in the prompts being presumed in the non-textual content returned by AI engine 104). Social media content generator 108 may thereafter combine the selected textual content and the non-textual content to generate a social media post. Subsequently, social media content generator 108 may repeat the operations of (i) selecting the textual content, (ii) selecting the non-textual content, and (iii) combining the selected textual content and the selected non-textual content to generate a plurality of social media posts for a particular one 116*a* of social media platforms 116.

In various embodiments, scheduling tool 110 may generate a schedule for each one in the plurality of social media posts. Social media manager 114 may thereafter automatically post each one in the plurality of social media posts on the particular one 116*a* of social media platforms 116 according to the generated schedule. Automatically posting the social media posts may include accessing the appropriate social media platform 116 using suitable access tokens, and executing the appropriate function to post (e.g., publish, make visible, etc.) through a corresponding API of social media platform 116.

The operations as described may be repeated for each different one of social media platforms 116 as desired and based on particular needs. For example, subsequent to generating different social media posts for plurality of social media platforms 116, respective schedules may be generated for the different social media posts on each one in the plurality of social media platforms 116. Social media manager 114 may automatically post the plurality of social media posts on the corresponding social media platforms 116 according to the respective schedules. For example, a first plurality of social media posts may be generated for social media platform 116*a* and scheduled to be posted according to a first schedule; a second plurality of social media posts may be generated for social media platform 116*b* and scheduled to be posted according to a second schedule; and so on. Social media manager 114 may store the social media posts and associated schedules and post them automatically on the corresponding social media platforms 116a and 116b without any additional user intervention.

In various embodiments, social media manager 114 may retrieve post insights about one or more social media post in the plurality of social media posts. The post insights comprise interactions with the respective social media post by users on the respective one or more social media platform 116. The post insight may depend on the type of social media platform 116 from which the post insight is generated. For example, some social media platforms 116 may support "comments" from users interacting with the social media posts; accordingly, post insights may include "comments." Some other social media platforms 116 may support "likes" from users interacting with the social media posts; accordingly, post insights may include "likes." Some other social media platforms 116 may support "tags" from users interacting with the social media posts; accordingly, post insights may include "tags." Some other social media platforms 116 may support "shares" from users interacting with the social media posts; accordingly, post insights may include "shares." Some other social media platforms 116 may support "reposts" from users interacting with the social media posts; accordingly, post insights may include "reposts," and so on. Any type of interaction of users with the posted social media posts may be included in post insights as used herein.

Social media content generator 108 may thereafter update the generated social media posts according to the post insights. For example, a particular social media post advertising product A may be shared by more users or liked by more users than another social media post advertising another product B. Accordingly, a social media post scheduled to be posted in the future with information about product B may be updated with information about product A. In some embodiments, the schedule of the social media posts may also be updated based on the post insights. For example, the social media post with information about product B may have been scheduled to be posted on date 1 coinciding with a scheduled sale of product B. After the social media post is updated with information about product A, the schedule may be changed to post the social media post on date 2 coinciding with a scheduled sale of product A. Various other changes to the schedule based on post insights may be included as desired and based on particular needs within the broad scope of the embodiments.

In some embodiments, after a first plurality of social media posts is generated by social media content generator 108, subsets comprising one or more of the generated social media posts may be updated by changing values of specific fields in the social media posts. For example, a specific field may be the location of a sale. The sale may be in location A in one social media post. The social media post may be updated by changing the sale to location B and the updated social media post may be posted on another date according to the user's inputs as appropriate. In another example, the social media post may include the name of a social media platform 116a and link thereto. The social media post may be updated by changing the name to that of social media platform 116b and the associated link, so that the updated social media post may direct users to different social media platform 116b. Various other fields may be varied as desired and based on particular needs within the broad scope of the embodiments herein.

In some embodiments, after a first plurality of social media posts is generated by social media content generator 108, subsets comprising one or more of the generated social media posts may be updated according to configuration settings for the respective social media platforms 116. Merely as an example, configuration settings for social media platform 116a may allow posting to separate groups of customers of a dentist business. A first group of users may be interested in teeth whitening, and a second group may be interested in teeth straightening. Accordingly, social media posts generated to advertise "teeth whitening" for the first group of users may be modified to advertise "teeth straightening" for the second group of users, and the respective social media posts may be posted to the first group of users and the second group of users accordingly. Various other configuration settings may be used to update the social media posts as desired and based on particular needs within the broad scope of the embodiments herein.

In some embodiments, the content of the social media posts may be updated according to a suitable combination of the above. For example, certain social media posts may be updated based on the post insights, changes to values of specific fields, and according to configuration settings. Certain other social media posts may be updated based on the post insights and changes to values of specific fields only. Certain other social media posts may be updated based on the post insights and configuration settings only, and so on.

In some embodiments, the generated social media posts and schedule may be sent to the customer for feedback on frontend 106. In some such embodiments, social media manager 114 may post the social media posts as scheduled without waiting for the requested feedback. Any feedback received may be used to update social media posts in future postings. In some other such embodiments, social media manager 114 may wait to post any social media post until feedback is received from the user. Feedback may be in the form of approval, edits, suggestions, comments, etc. as desired and based on particular needs. Social media content generator 108 may update social media posts according to the feedback in various embodiments. In some embodiments, responsive to the feedback, social planner tool 102 may make a determination of at least one of: (i) terminating the posting of one or more social media posts on the applicable one of social media platforms 116, (ii) continuing the posting of the social media posts on the applicable one of social media platforms 116, and (iii) modifying one or more of the social media posts before posting it on the applicable one of social media platforms 116.

Figure 2:
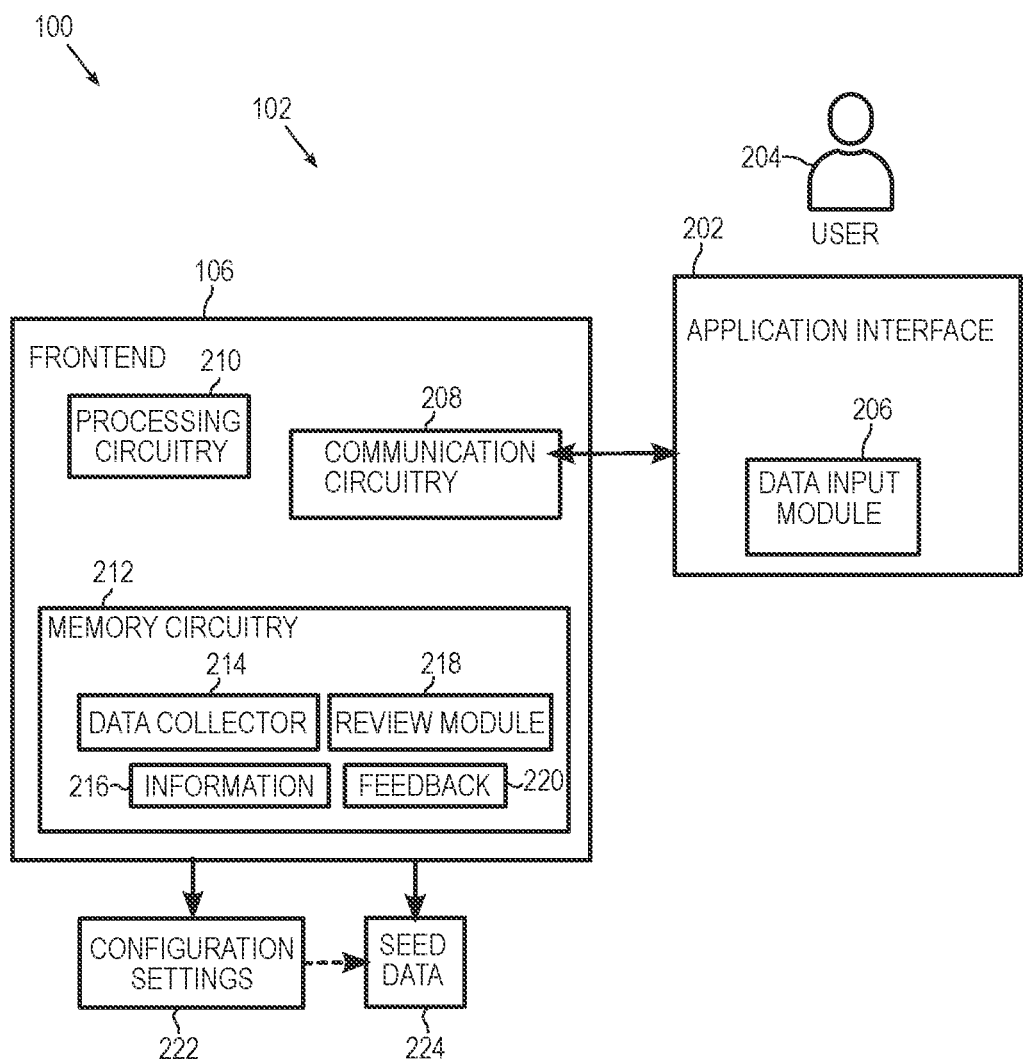
FIG. 2 is a simplified block diagram illustrating example details in a system for automatically generating, scheduling, posting, and recycling social media posts using AI, according to some embodiments of the present disclosure.

FIG. 2 is a simplified block diagram illustrating example details of frontend 106 of social planner tool 102 and other details in system 100 according to various embodiments. Frontend 106 may interface with an application interface 202. Application interface 202 may comprise a web browser in some embodiments and mobile application interface in some other embodiments. Application interface 202 may be used by a user 204 for interacting with frontend 106 in various embodiments. Application interface 202 may include a data input module 206 through which user 204 may provide information to frontend 106. Data input module 206 may be provisioned in a graphical user interface (GUI), command line interface (CLI), text interface or other suitable means by which user 204 may input data.

In some embodiments, application interface 202 may be presented on a suitable display device appropriate to show visual indicators, such as a heads-up display, a computer monitor, a projector, a touchscreen display, a liquid crystal display (LCD), a light-emitting diode display, and/or a flat panel display. In some embodiments, application interface 202 may be provisioned in the same computing device as frontend 106. In other embodiments, application interface 202 may be provisioned in another computing device separate from the computing device in which frontend 106 is provisioned.

Frontend 106 may include communication circuitry 208 for interacting with application interface 202. For example, communication circuitry 208 may be configured for managing wireless communications for the transfer of data to and from frontend 106. The term "wireless" and its derivatives may be used to describe circuits, devices, systems, methods, techniques, communications channels, etc., that may communicate data through modulated electromagnetic radiation in a nonsolid medium. The term does not imply that the associated devices do not contain any wires, although in some embodiments they might not.

Communication circuitry 208 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long Term Evolution (LTE) project along with any amendments, updates, and/or revisions (e.g., advanced LTE project, ultramobile broadband (UMB) project (also referred to as "3GPP2"), etc.). Communication circuitry 208 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. Communication circuitry 208 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication circuitry 208 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication circuitry 208 may operate in accordance with other wireless protocols in other embodiments. Communication circuitry 208 may include antennas to facilitate wireless communications and/or to receive other wireless communications.

In some embodiments, communication circuitry 208 may manage wired communications, such as electrical, optical, or any other suitable communication protocols (e.g., the Ethernet, Internet). As noted above, communication circuitry 208 may include multiple communication chips. For instance, a first communication chip may be dedicated to shorter-range wireless communications such as Wi-Fi or Bluetooth, and a second communication chip may be dedicated to longer-range wireless communications such as global positioning system (GPS), EDGE, GPRS, CDMA, WiMAX, LTE, EV-DO, or others. In some embodiments, a first communication chip may be dedicated to wireless communications, and a second communication chip may be dedicated to wired communications.

Frontend 106 may be provisioned in a suitable computing device having any desired form factor, such as a handheld or mobile computing device (e.g., a cell phone, a smart phone, a mobile Internet device, a tablet computer, a laptop computer, a netbook computer, an ultra-book computer, a Personal Digital Assistant (PDA), an ultramobile personal computer, etc.), a desktop computing device, a server or other networked computing component, a set-top box, an entertainment control unit, a vehicle control unit, or a wearable computing device. In some embodiments, frontend 106 may be provisioned in one or more servers (e.g., real servers, or virtual machines, or one or more machines running in a cloud infrastructure as a service, or multiple servers networked together). Such computing device may be provisioned with processing circuitry 210 that may form part of frontend 106. Processing circuitry 210 may be configured to execute instructions stored in memory circuitry 212. The instructions may be stored as code of various programs in memory circuitry 212.

In some embodiments, memory circuitry 212 may comprise non-transitory computer-readable media, including one or more memory devices such as volatile memory such as dynamic random access memory (DRAM), nonvolatile memory (e.g., read-only memory (ROM)), flash memory, solid-state memory, and/or a hard drive. In some embodiments, memory circuitry 212 may include memory that shares a die with processing circuitry 210. Memory circuitry 212 may be part of the computing device in which frontend 106 is provisioned. Memory circuitry 212 may include algorithms, code, software modules, and applications, which may be executed by processing circuitry 210. In particular embodiments, memory circuitry 212 may include a data collector 214 comprising instructions for collecting and aggregating information 216 from user 204 and other sources, and a review module 218 comprising instructions for collecting feedback 220 from user 204.

In some embodiments, information 216 and feedback 220 may comprise data containing different logical meanings. In some other embodiments, information 216 and feedback 220 may comprise data containing the same logical meanings. In some other embodiments, feedback 220 may be exclusively received from user 204 (who may comprise the same or different individuals); whereas information 216 may be received from user 204 and other sources, such as from the Internet. Examples of information 216 include: business niche targeted by the social media posts, target audience of the social media posts, login credentials to access various social media platforms 116, frequency of posting social media posts, information to be included in the content of social media posts, customer lists, business locations, social media platform rules, and other such data relevant to creating, scheduling, posting, and recycling social media posts. Examples of feedback 220 include edits, comments, reviews, suggestions, approvals, denials, etc. provided by user 204 in response to one or more social media posts and/or schedules (including for posting original social media posts and recycled social media posts).

In some embodiments, data collector 214 may receive data in one or more formats from data input module 206 of application interface 202 through communication circuitry 208. Data collector 214 may categorize the received data into at least one of configuration settings 222 and seed data 224. In some embodiments, data collector 214 may also facilitate presenting forms, questions, etc. on application interface 202. Answers to the questions presented or filling in values of fields in the forms may facilitate data entry by user 204 relevant for creating, scheduling, posting, and recycling social media posts. In some other embodiments, user 204 may enter free form text in data input module 206, and data collector 214 may parse the information, analyze the free form text using natural language processing algorithms and extract suitable data relevant to create, schedule, post and recycle social media posts.

Review module 218 may send social media posts and associated schedules to application interface 202, receive data in response thereto from data input module 206 of application interface 202 through communication circuitry 208, and categorize it into at least one of configuration settings 222 and seed data 224. In some embodiments, review module 218 may also facilitate presenting forms, questions, etc. on application interface 202. Answers to the questions presented or filling in values of fields in the forms may facilitate data entry by user 204. The data thus entered may be extracted by review module 218 and collated into feedback 220. In some other embodiments, user 204 may enter free form text in data input module 206, and review module 218 may parse the information, analyze the free form text using natural language processing algorithms and extract feedback 220 therefrom.

Configuration settings 222 may be stored in social planner tool 102 and seed data 224 may be provided to AI engine 104 for various analysis (in addition to being stored in social planner tool 102). In some embodiments, at least a portion of seed data 224 may be derived from configuration settings 222. Configuration settings 222 may include, by way of examples and not as limitations, login information for various social media platforms 116; settings for separate social media platforms 116 (e.g., profiles, "friends" list, "contacts" list, subscribed groups list, "follower" list, "followed" list, "liked" list, etc.); business size; markets; etc. Seed data 224 may include, by way of examples and not as limitations, business niches targeted by various social media posts; geographic locations of targeted audience; etc.

In some embodiments, information contained in configuration settings 222 and seed data 224 may be interchangeable and the difference between them may be one of purpose (e.g., seed data 224 used by AI engine 104) at any given instance. In such embodiments, a certain piece of information may form part of configuration settings 222 and may be included into seed data 224 when a request is sent to AI engine 104. For example, the target audience of social media posts may be stored as configuration settings 222; further, sale dates of product A may also be stored as configuration settings 222. User 204 may also desire to generate social media posts advertising the sale dates of product A. In some such embodiments, the sales dates and target audience may be used as seed data 224 to create social media posts.

In some other embodiments, configuration settings 222 may be generated and stored during the initial stages of setting up social planner tool 102 and thereafter not changed unless a need arises, whereas seed data 224 may be generated each time there is need to create social media posts, or schedule them as appropriate. For example, the store location of the business and target audience of the business may be stored as configuration settings 222 when user 204 initially sets up social planner tool 102. Thereafter, when user 204 desires to create social media posts, user 204 may input appropriate information 216 that may be used as seed data 224. In some such embodiments, a portion of seed data 224, such as the business niche and target audience (among others) may be derived from configuration settings 222 also.

Figure 3A:
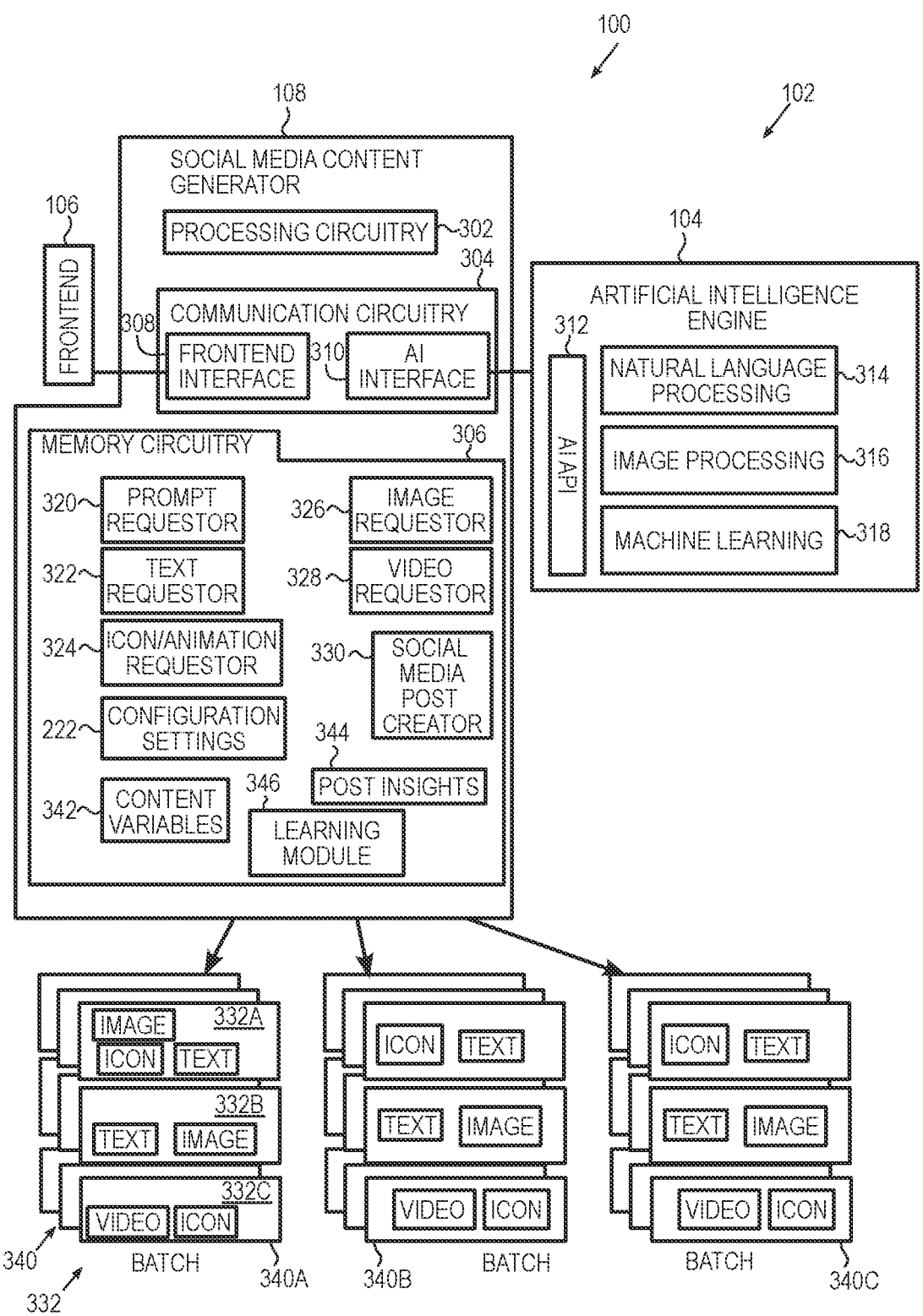
FIGS. 3A-3C are simplified block diagrams illustrating other example details in a system for automatically generating, scheduling, posting, and recycling social media posts using AI, according to some embodiments of the present disclosure.
Figure 3B:
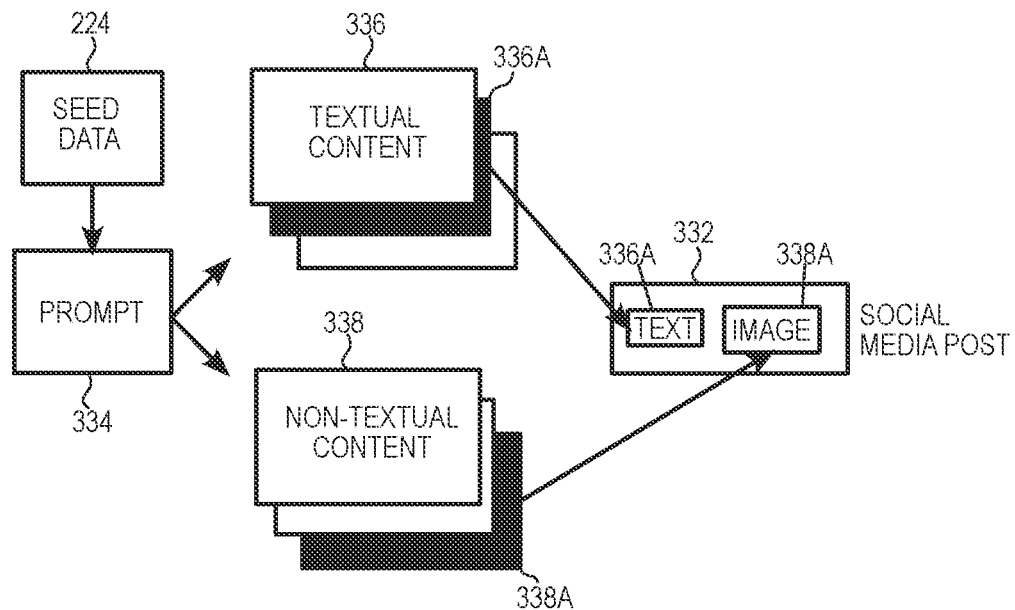
Figure 3C:
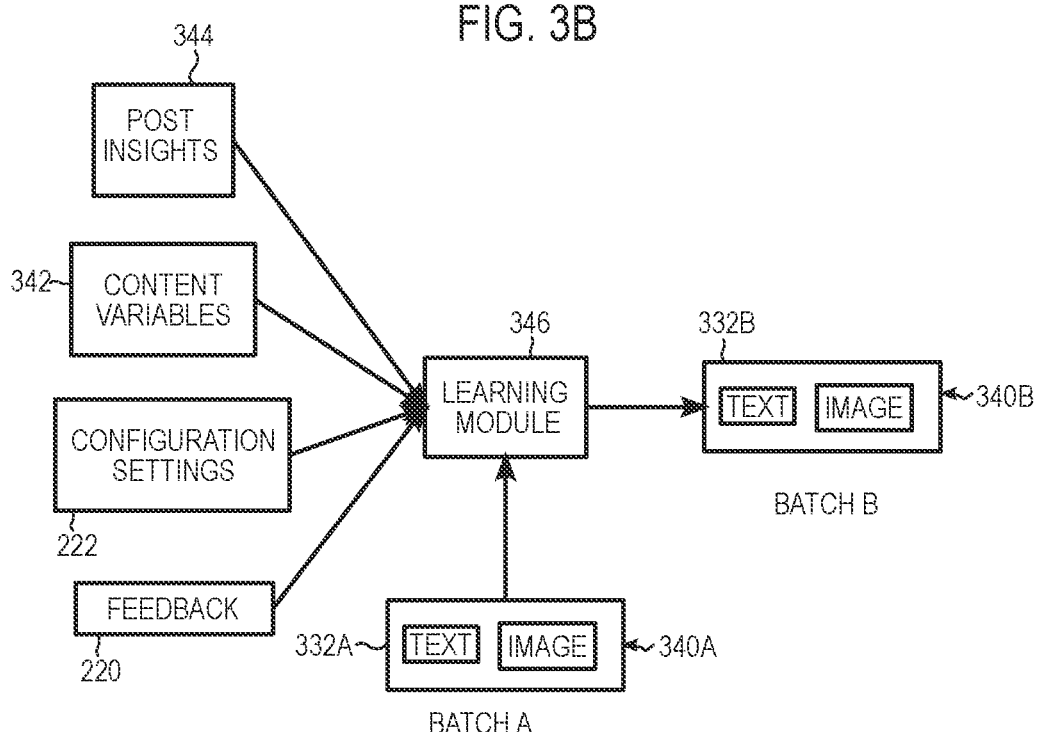

FIGS. 3A-3C are simplified block diagrams illustrating example details of system 100 according to various embodiments. Social media content generator 108 may include processing circuitry 302, communication circuitry 304 and memory circuitry 306 substantially similar in electronic structure to processing circuitry 210, communication circuitry 208 and memory circuitry 212 described in reference to previous FIG. 2. In embodiments wherein frontend 106 and social media content generator 108 are provisioned in the same computing device, processing circuitry 302, communication circuitry 304 and memory circuitry 306 may be substantially same as processing circuitry 210, communication circuitry 208 and memory circuitry 212.

Further, processing circuitry 302 may be configured to interact with communication circuitry 304 and execute instructions stored in memory circuitry 306 suitably. Communication circuitry 304 may further include a frontend interface 308 configured to receive seed data 224 and configuration settings 222 from frontend 106. In some embodiments, frontend interface 308 may also be configured to send social media posts generated by social media content generator 108 to frontend 106. Communication circuitry 304 may also include an AI interface 310 for interfacing with an AI API 312 in AI engine 104.

AI API 312 may comprise a set of routines, protocols, and tools for requesting specific analysis from AI engine 104 and receiving responses therefrom. Furthermore, AI API 312 may describe software components of AI engine 104 in terms of its operations, inputs, outputs, and underlying types, defining functionalities that are independent of their respective implementations, which allows definitions and implementations to vary without compromising the functionalities of AI engine 104. As such, AI API 312 may provide social planner tool 102 with appropriate access to various functionalities of AI engine 104.

In various embodiments, AI engine 104 may include various modules for natural language processing 314, image processing 316, and machine learning 318. AI engine 104 may be provisioned in a server or other computing device separate from social planner tool 102 in some embodiments; in other embodiments, AI engine 104 may be provisioned in the same server or other computing device as social planner tool 102. In various embodiments, the modules for natural language processing 314 may comprise commercially available modules, including ChatGPT™, Wordsmith™, Quill™, etc.; the modules for image processing 316 may include various software for generating images (e.g., from other images, from text, etc.), editing images (e.g., changing content, formatting content, etc.), etc., such as Dall-E™, Midjourney™, and Wombo™ (among others). The modules for machine learning 318 may include commercially available software, such as TensorFlow™, RapidMiner™, PyTorch™, etc. AI engine 104 may be configured to receive prompts, perform appropriate analysis based on the prompts, and return the results of the analysis over AI API 312.

Memory circuitry 306 in social media content generator 108 may include various modules for generating requests for prompts, texts, images, videos, icons/animations, etc. A prompt requestor 320 may generate one or more prompts requesting other prompts from AI engine 104. To generate the request, prompt requestor 320 may use seed data 224 and/or provide seed data 224 appropriately in the request. For example, prompt requestor 320 may generate a prompt such as, "Give me 10 prompts for creating social media posts for a real estate agency operating in location A." The request may be generated based on seed data 224 indicating a business niche of real estate agency and location A. Seed data 224 may be provided directly from frontend 106 or derived suitably from configuration settings 222 stored in memory circuitry 306 (e.g., configuration settings 222 may be received previously from frontend 106).

The request may be provided to AI API 312 through AI interface 310. In response, AI engine 104 may respond with 10 prompts for creating social media posts for a real estate agency operating in location A, such as: "1. Did you know that location A is one of the most popular places to live in State B? Our team is here to help you find your dream home in this beautiful area! 2. Looking for a home with a pool? We've got you covered! Our team can help you find the perfect property with a refreshing pool for those hot days in location A; 3. Ready to upgrade your living space? We've a variety of stunning homes in location A that will take your breath away. Contact us to schedule a showing today." And so on. The responses may be received by AI interface 310 from AI API 312.

A text requestor 322 may select one of the prompts returned previously and generate a request for textual content applicable to specific social media platforms based on the selected prompt. For example, text requestor 322 may generate a request: "Use this prompt and create 5 social media posts for Facebook™: Did you know that location A is one of the most popular places to live in State B? Our team is here to help you find your dream home in this beautiful area!" In response, AI engine 104 may respond with 5 social media posts comprising textual content only: "1. Location A is calling your name! Our team is here to help you find the perfect home in this highly desirable area. Contact us today to start your search! 2. "Looking for a new place to call home? Look no further than location A. Our team can help you find the perfect property to fit your lifestyle and budget." And so on.

Text requestor 322 may select another prompt from the list of prompts returned previously by AI engine 104 in response to the request for prompts by prompt requestor 320. Thereafter, text requestor 322 may generate another request using the selected prompt, the another request being for social media content specific to a different social media platform: "Use this prompt and create 7 social media posts for Instagram™: Looking for a home with a pool? We've got you covered! Our team can help you find the perfect property with a refreshing pool for those hot days in location A." In response, AI engine 104 may generate 7 social media posts for Instagram™: 1. Nothing says location A living like a beautiful home with a pool! Our team can help you find your dream home complete with your own private oasis. <Icon1><Icon2>; 2. Say goodbye to the heat with your own personal pool. Our experienced agents can help you find the perfect home with a pool to cool off on those hot days in location A. <Icon3><Icon4>;" and so on. The operations may be repeated any number of times as desired for various different social media post content and/or social media platforms 116.

An icon/animator requestor 324 may select a particular textual content from the responses returned by AI engine 104 to text requestor 322. Icon/animator requestor 324 may thereafter generate a request for icons and/or animations appropriate to the selected textual content. For example, icon/animation requestor 324 may generate a request: "Use this prompt and create 5 suitable icons for Instagram™: Nothing says location A living like a beautiful home with a pool! Our team can help you find your dream home complete with your own private oasis." In response, AI engine 104 may respond with 5 suitable icons generated to match the tone and/or semantics of the selected textual content.

An image requestor 326 may select a particular textual content from the responses returned by AI engine 104 to text requestor 322. Image requestor 326 may thereafter generate a request for images appropriate to the selected textual content. For example, image requestor 326 may generate a request: "Use this prompt and create 5 suitable images for Facebook™: Location A is calling your name! Our team is here to help you find the perfect home in this highly desirable area. Contact us today to start your search!" In response, AI engine 104 may respond with 5 suitable images generated to match the tone and/or semantics of the selected textual content.

A video requestor 328 may select a particular textual content from the responses returned by AI engine 104 to prompts by text requestor 322. Image requestor 326 may thereafter generate one or more prompts requesting videos appropriate for the selected textual content. For example, video requestor 328 may generate a prompt: "Use this prompt and create 5 suitable videos for Facebook™: Location A is calling your name! Our team is here to help you find the perfect home in this highly desirable area. Contact us today to start your search!" In response, AI engine 104 may respond with 5 suitable videos generated to match the tone and/or semantics of the selected textual content. In some embodiments, video requestor 328 may also be used to generate audio content by separating the image from the audio suitably.

A social media post creator 330 may thereafter combine the selected textual content (i.e., selected by icon/animation requestor 324, image requestor 326, video requestor 328) and/or the corresponding non-textual content (e.g., icons, animations, images, videos, etc.) returned by AI engine 104 according to applicable rules of various social media platforms 116 to generate one or more social media posts 332 as indicated in FIG. 3B. Seed data 224 may be used by prompt requestor 320 to generate one or more prompts from which prompt 334 may be selected as described previously. In response to prompt 334, AI engine 104 may return textual content 336 and non-textual content 338. In some embodiments, icon/animation requestor 324, image requestor 326, and/or video requestor 328 may select textual content 336A from textual content 336 returned by AI engine 104. Social media post creator 330 may select non-textual content 338A from non-textual content 338 returned by AI engine 104 in response to prompt 334. In some other embodiments, social media post creator 330 may select both textual content 336A and non-textual content 338A. Social media post 332 may be created by combining selected textual content 336A and non-textual content 338A suitably.

Turning back to FIG. 3A, in an example embodiment, social media post creator 330 may combine a first textual content, a first image, and a first icon to generate first social media post 332a; social media post creator 330 may combine a second textual content and a second image to generate second social media post 332b; social media post creator 330 may combine a video and a second icon to generate third social media post 332c; and so on. Any number of textual content and non-textual content may be combined in any suitable number and manner to generate various different social media posts 332 as desired and based on particular needs.

In some embodiments, the combination of textual content and/or non-textual content may be based on the rules of social media platforms 116. For example, social media post 332a may be generated according to the rules of Twitter™ with first textual content being limited by a certain word count and image and icon conforming to the relevant Twitter™ rules. Social media post 332b may be generated according to the rules of Facebook™; and so on. In some embodiments, social media post creator 330 may take into account various configuration settings 222 to generate social media posts 332. For example, the consumers of product A of a particular business may be more active on Facebook™ rather than other social media platforms. The consumers may also be of a certain demographic (e.g., corresponding to age, gender, geographic location, college graduates, working in retail, etc.). Social media post creator 330 may consider the demographic and/or identities, preferences, etc. of the consumers as provided by configuration settings 222 to combine the textual content and/or non-textual content in generating social media posts 332.

In various embodiments, different pluralities of social media posts 332 may be grouped into batches 340. The grouping may be according to any suitable criteria. For example, batches 340a, 340b and 340c may be differentiated by locations of posting (e.g., United States, India, etc.). In another example, batches 340a, 340b, and 340c may be differentiated by target audience such as homeowners, renters, and home insurers. In some embodiments, batches 340 may be according to posting schedule. For example, batches 340a, 340b, and 340c may be for posting in first quarter, second quarter, and third quarter of a year. In other embodiments, each batch 340 may correspond to specific values of one or more content variables 342. For example, content variables 342 may include an advertised product; batch 340a may advertise product A, batch 340b may advertise product B, batch 340c may advertise product C, and so on. In yet other embodiments, post insights 344 may be received from social media platforms 116 in response to previous postings. Post insights 344 may include, by way of examples and not as limitations, comments, shares, likes, reposts, etc. specific to the particular social media platform where the previous social media post was posted.

A learning module 346 may use post insights 344 to specify additional rules for post creation. As indicated by the simplified block diagram of FIG. 3C, learning module 346 may also consider feedback 220, configuration settings 222 and content variables 342 to generate the additional rules. Social media post creator 330 may use the additional rules to modify social media posts 332a in a first batch 334a to generate another social media post 332b in a second batch 334b. In some embodiments, the additional rules may be generated based on a subset (e.g., one or two, or three) of post insights 344, content variables 342, feedback 220, and configuration settings 222. Social media post creator 330 may take such additional rules into account to generate social media post 332a in batch 334a and thereafter modify the remaining subsets (e.g., three or two or one) of post insights 344, content variables 342, feedback 220, and configuration settings 222 to generate another social media post 332b in batch 334b.

Figure 4A:
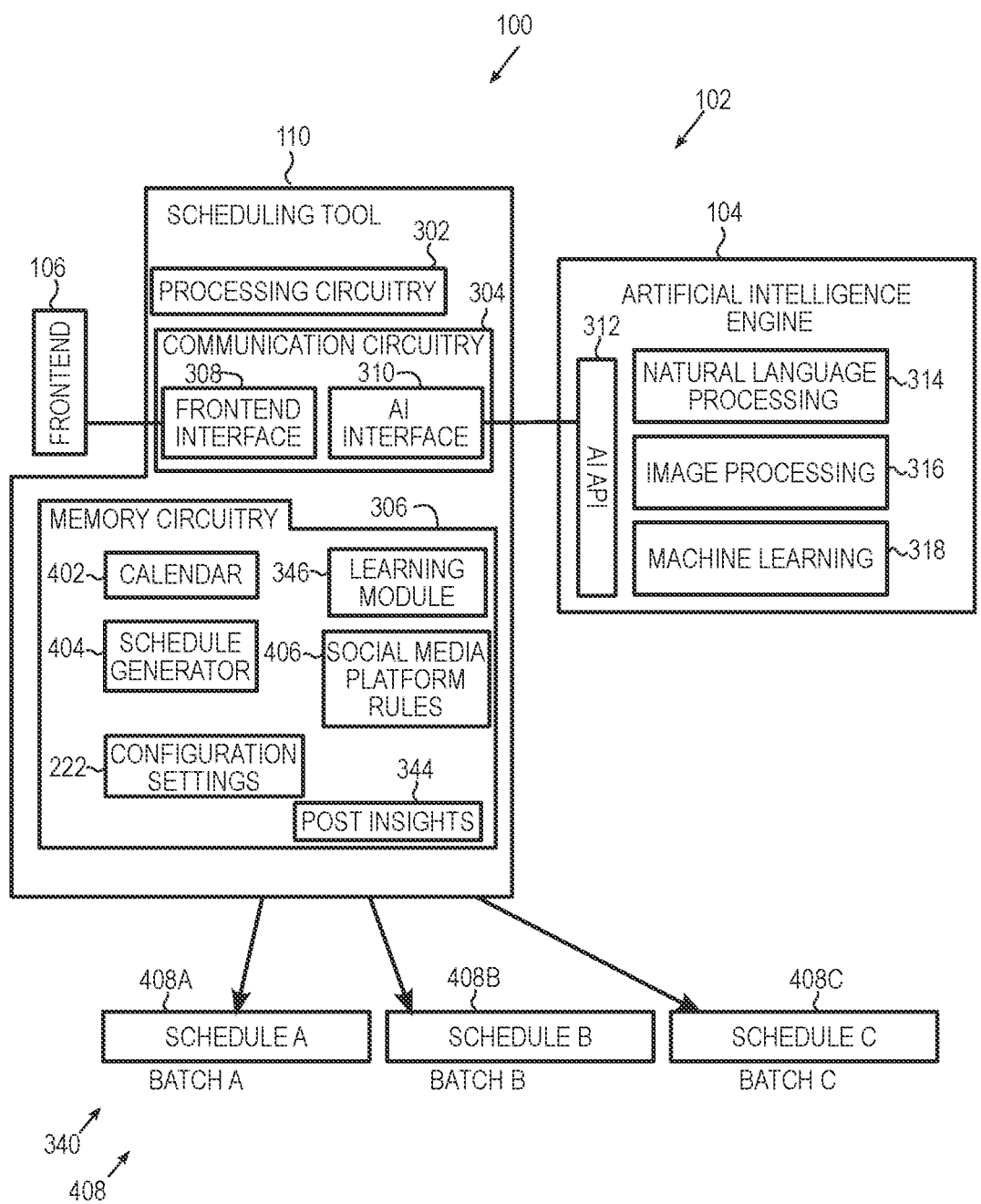
FIGS. 4A-4B are simplified block diagrams illustrating yet other example details in a system for automatically generating, scheduling, posting, and recycling social media posts using AI, according to some embodiments of the present disclosure.
Figure 4B:
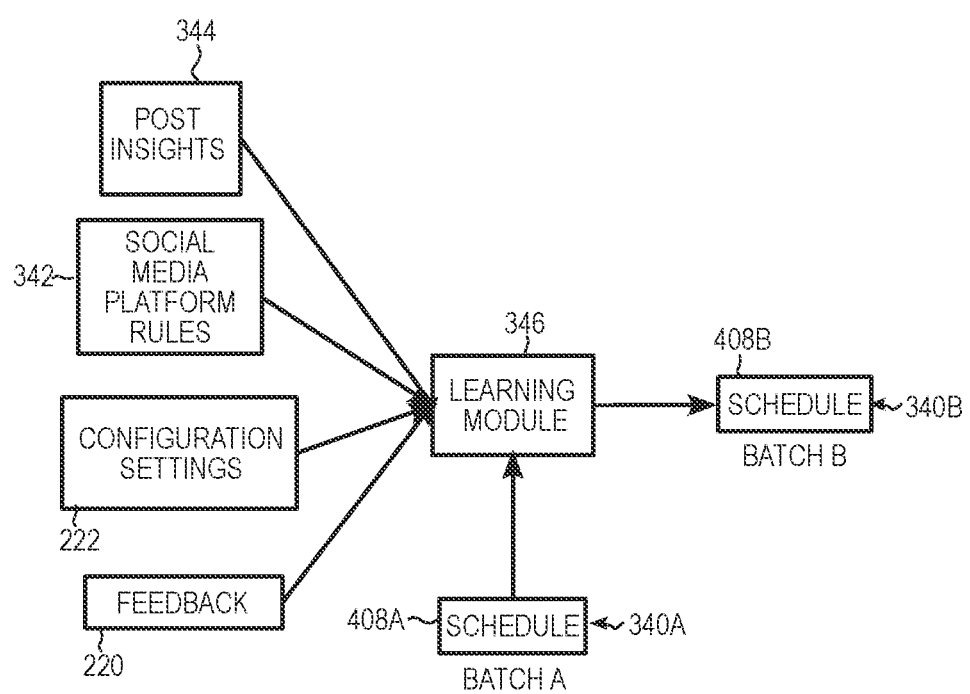

FIGS. 4A-4B are simplified block diagrams illustrating example details of system 100 according to various embodiments. Scheduling tool 110 may include processing circuitry 302, communication circuitry 304 and memory circuitry 306 as described in reference to previous FIG. 3A. In embodiments wherein social media content generator 108 and scheduling tool 110 are provisioned in different computing devices, processing circuitry 302, communication circuitry 304 and memory circuitry 306 as described in reference to scheduling tool 110 may be different components but substantially same in structures as corresponding elements in social media content generator 108.

As described previously, processing circuitry 302 may be configured to interact with communication circuitry 304 and execute instructions stored in memory circuitry 306 suitably. Communication circuitry 304 may include frontend interface 308 configured to receive seed data 224 and configuration settings 222 from frontend 106. In some embodiments, frontend interface 308 may also be configured to send social media posts 332 and other data to frontend 106. Communication circuitry 304 may also include AI interface 310 for interfacing with AI API 312 in AI engine 104. In various embodiments, AI engine 104 may include various modules for natural language processing 314, image processing 316, and machine learning 318 as described in reference to FIG. 3A.

Memory circuitry 306 may include learning module 346 as described in reference to FIG. 3A. Memory circuitry 306 may also store configuration settings 222 and post insights 344 suitably. Further, memory circuitry 306 may include a calendar 402, a schedule generator 404, and a data store comprising social media platform rules 406. Scheduling tool 110 may communicate with AI engine 104 to generate suitable schedule 408 for social media posts 332 in one or more batches 340. For example, schedule 408a may be generated for social media posts 332 in batch 334a; schedule 408b may be generated for social media posts 332 in batch 334b; and so on.

As shown in FIG. 4B, learning module 346 may use one or more of post insights 344, content variables 342, feedback 220, and configuration settings 222 to specify rules for post scheduling. Schedule generator 404 may use the rules to generate schedules 408 for social media posts 332 in batches 340. For example, the schedule may specify posting social media posts 332 about sales on Mondays of every week in the first quarter of the year based on production schedules of product A as obtained from configuration settings 222, post insights 344 that Mondays are better than other days of the week for user interaction, social media platform rules 406 that only one post may be posted each week, and feedback 220 that posting is preferred to be weekly rather than bi-weekly. In some embodiments, the rules may be generated based on a subset (e.g., one or two or three) of post insights 344, content variables 342, feedback 220, and configuration settings 222. Schedule generator 404 may generate schedule 408a in batch 340a based on such rules. Schedule generator 404 may modify the remaining subsets (e.g., three or two or one) of post insights 344, content variables 342, feedback 220, and configuration settings 222 to modify schedule 408a into another schedule 408b for social media posts 332 in batch 334b.

Figure 5:
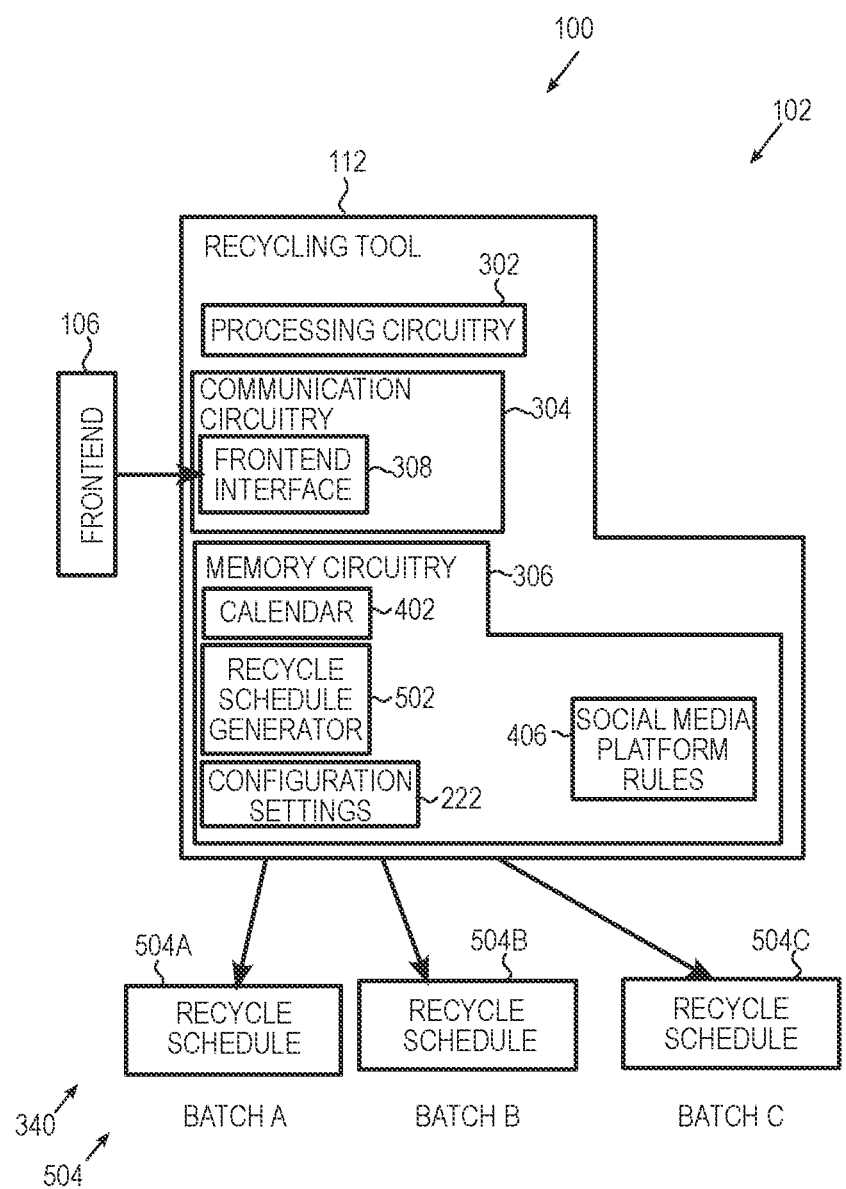
FIG. 5 is a simplified block diagram illustrating yet other example details in a system for automatically generating, scheduling, posting, and recycling social media posts using AI, according to some embodiments of the present disclosure.

FIG. 5 is a simplified block diagram illustrating example details of recycling tool 112 in social planner tool 102 of system 100 according to some embodiments. Recycling tool 112 may include processing circuitry 302, communication circuitry 304 and memory circuitry 306 as described in reference to previous FIG. 3A. In embodiments wherein social media content generator 108 and recycling tool 110 are provisioned in different computing devices, processing circuitry 302, communication circuitry 304 and memory circuitry 306 as described in reference to recycling tool 112 may be substantially same in structures as corresponding elements in social media content generator 108.

As described previously, processing circuitry 302 may be configured to interact with communication circuitry 304 and execute instructions stored in memory circuitry 306 suitably. Communication circuitry 304 may include frontend interface 308 configured to receive seed data 224 and configuration settings 222 from frontend 106. In some embodiments, frontend interface 308 may also be configured to send social media posts 332 and other data to frontend 106. Memory circuitry 306 may store configuration settings 222 and social media platform rules 406 suitably. Further, memory circuitry 306 may include calendar 402, and a recycle schedule generator 502. Based on configuration settings 222 specifying recycling attributes, such as the specific ones of social media posts 332 to be recycled, and social media platform rules 406 specifying whether recycling is permitted and if so, how often, recycle schedule generator 502 may generate suitable recycle schedules 504 for social media posts 332 in one or more batches 340. For example, recycle schedule 504a may be generated for social media posts 332 in batch 334a; recycle schedule 504b may be generated for social media posts 332 in batch 334b; and so on. Each recycled social media post 332 may be substantially identical to the original social media post 332.

Figure 6:
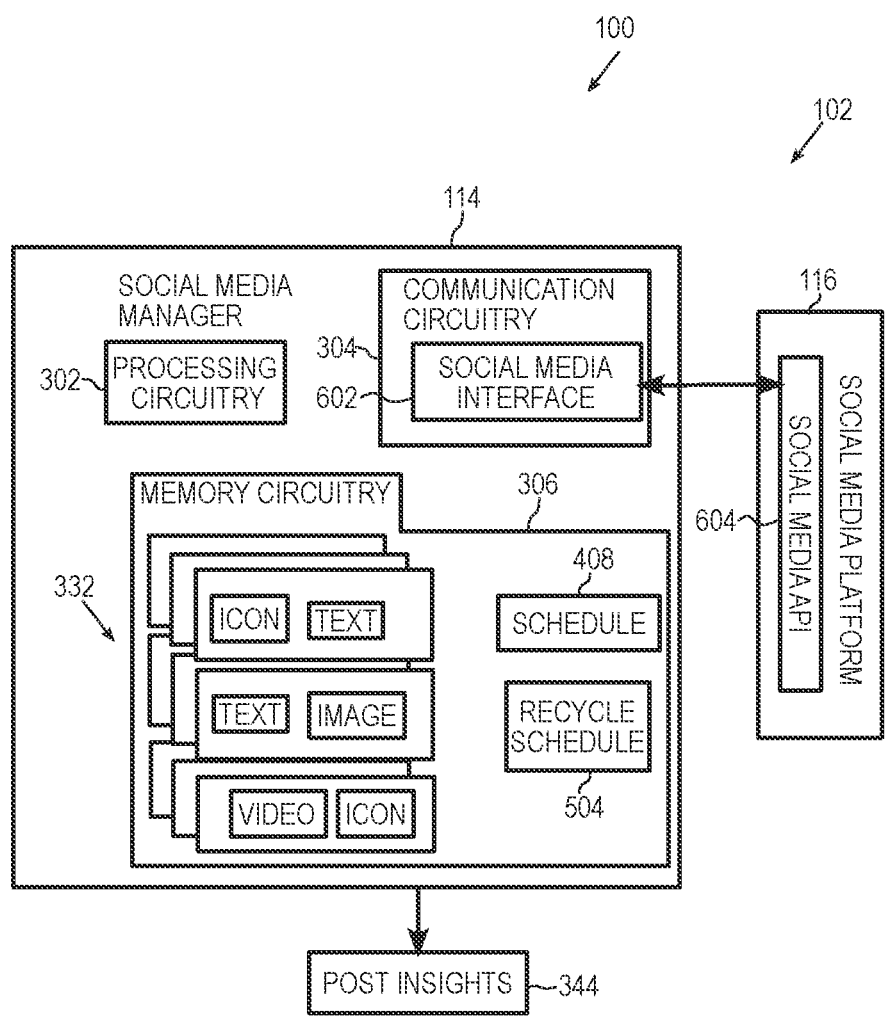
FIG. 6 is a simplified block diagram illustrating yet other example details in a system for automatically generating, scheduling, posting, and recycling social media posts using AI, according to some embodiments of the present disclosure.

FIG. 6 is a simplified block diagram illustrating example details of social media manager 114 in social planner tool 102 of system 100 according to some embodiments. Social media manager 114 may include processing circuitry 302, communication circuitry 304 and memory circuitry 306 as described in reference to previous FIG. 3A. In embodiments wherein social media content generator 108 and social media manager 114 are provisioned in different computing devices, processing circuitry 302, communication circuitry 304 and memory circuitry 306 as described in reference to social media manager 114 may be different components but substantially same in structures as corresponding elements in social media content generator 108.

As described previously, processing circuitry 302 may be configured to interact with communication circuitry 304 and execute instructions stored in memory circuitry 306 suitably. Communication circuitry 304 may include a social media interface 602 configured to communicate with a social media API 604 in social media platform 116. Note that in the figure, only one social media platform 116 is shown along with associated social media API 604. This is only for ease of illustration and should not be construed as a limitation. Any number of social media platforms may communicate with social media manager 114. Each such social media platform 116 may have its associated social media API 604 that may be different from other APIs.

Merely as an example, Facebook™ may provide various functionalities through its social media API, such as managing Facebook™ assets, permission controls, and advertisement campaigns for multiple pages and advertisement accounts; managing a business' presence and community on Facebook™; accessing and updating a Facebook™ Page's settings and content, creating posts, getting page insights; advertising on Facebook™ by automating advertisement management and creation, offering custom dashboards for insights and performance. Another social media platform 116, such as Instagram™, may provide other functionalities in social media API 604, such as managing published photos, videos, and stories, moderating comments, discovering @mentions, etc. Communication circuitry 304 may have correspondingly as many social media interfaces 602 as the number of social media APIs 604 in some embodiments. In other embodiments, social media interface 602 may be configured to communicate with any number of social media APIs 604 as desired and based on particular needs.

In some embodiments, each social media API 604 may be associated with separate software development kits (SDKs) installed in social planner tool 102 and accessed appropriately by social media interface 602 so that appropriate actions may be executed using correspondingly different function calls according to the respective social media API 604 and associated SDK. For example, function calls associated with Facebook™ may be different from corresponding ones associated with YouTube™. If a particular social media post 332 is to be posted on Facebook™, the appropriate function call may include, by way of example and not as a limitation, a "publish" function. On the other hand, if the particular social media post 332 is to be posted on YouTube™, the corresponding functions may include "upload" and "post"; and so on. Various other functions, including for accessing post insights 344, downloading analysis data, etc. may be included in social media interface 602 within the broad scope of the embodiments.

In some embodiments, the instructions for translating actions into appropriate function calls may be stored in memory circuitry 306 and executed by social media interface 602 suitably. Memory circuitry 306 may further store social media posts 332 and corresponding schedules 408 and recycle schedules 504. Social media manager 114 may communicate with social media platform 116 to post social media posts 332 according to schedule 408 and/or recycle schedule 504 as appropriate, receive post insights 344 from social media platform 116 and send post insights 344 to relevant modules within social planner tool 102 for further actions as described in reference to the previous figures.

Figure 7:
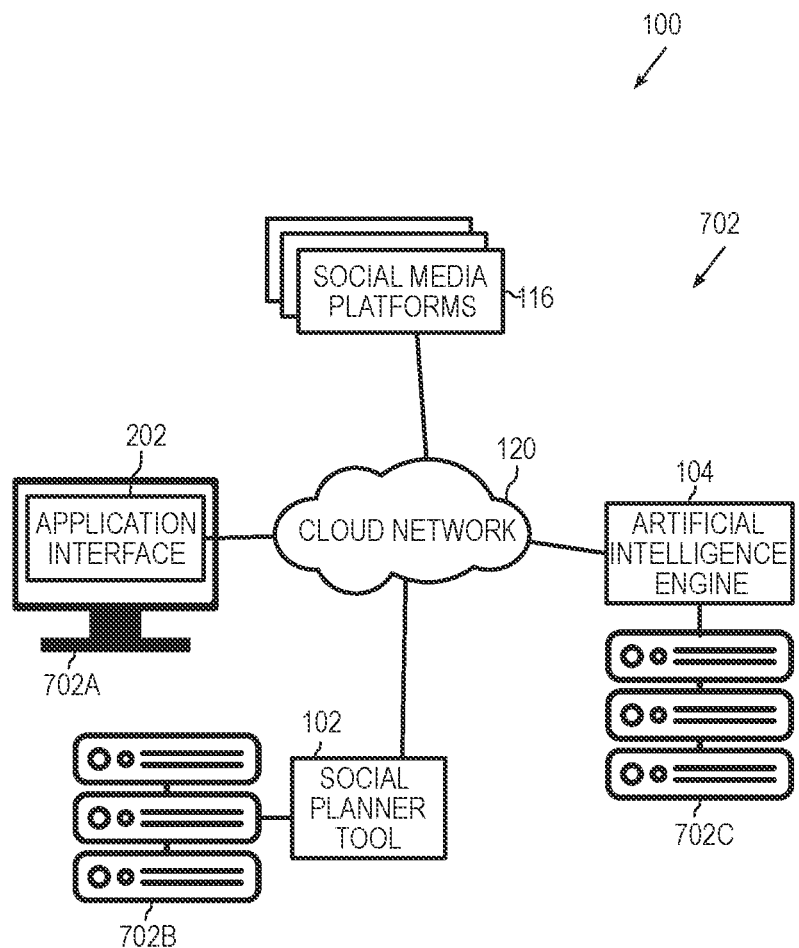
FIG. 7 is a simplified block diagram illustrating a system for automatically generating, scheduling, posting and recycling social media posts using AI, according to some embodiments of the present disclosure.

FIG. 7 is a simplified block diagram illustrating an example implementation of system 100. Social media platforms 116 may be hosted in cloud network 120. AI engine 104, application interface 202 and social planner tool 102 may be provisioned in separate computing devices 702 that are in communication with each other through cloud network 120. In an example embodiment, application interface 202 may be provisioned in computing device 702a, which may be a personal computer, such as a desktop computer, laptop, tablet, or smartphone; social planner tool 102 may be provisioned in computing device 702b, which may be a server; and AI engine 104 may be provisioned in another computing device 702c, which may be another server. Various other implementations may also be included within the broad scope of the embodiments. For example, AI engine 104 may execute in a plurality of virtual machines across several servers in some embodiments. In other embodiments, social planner tool 102 may be distributed across numerous computing devices in different locations in cloud network 120; and so on.

EXAMPLE METHODS

Figure 8:
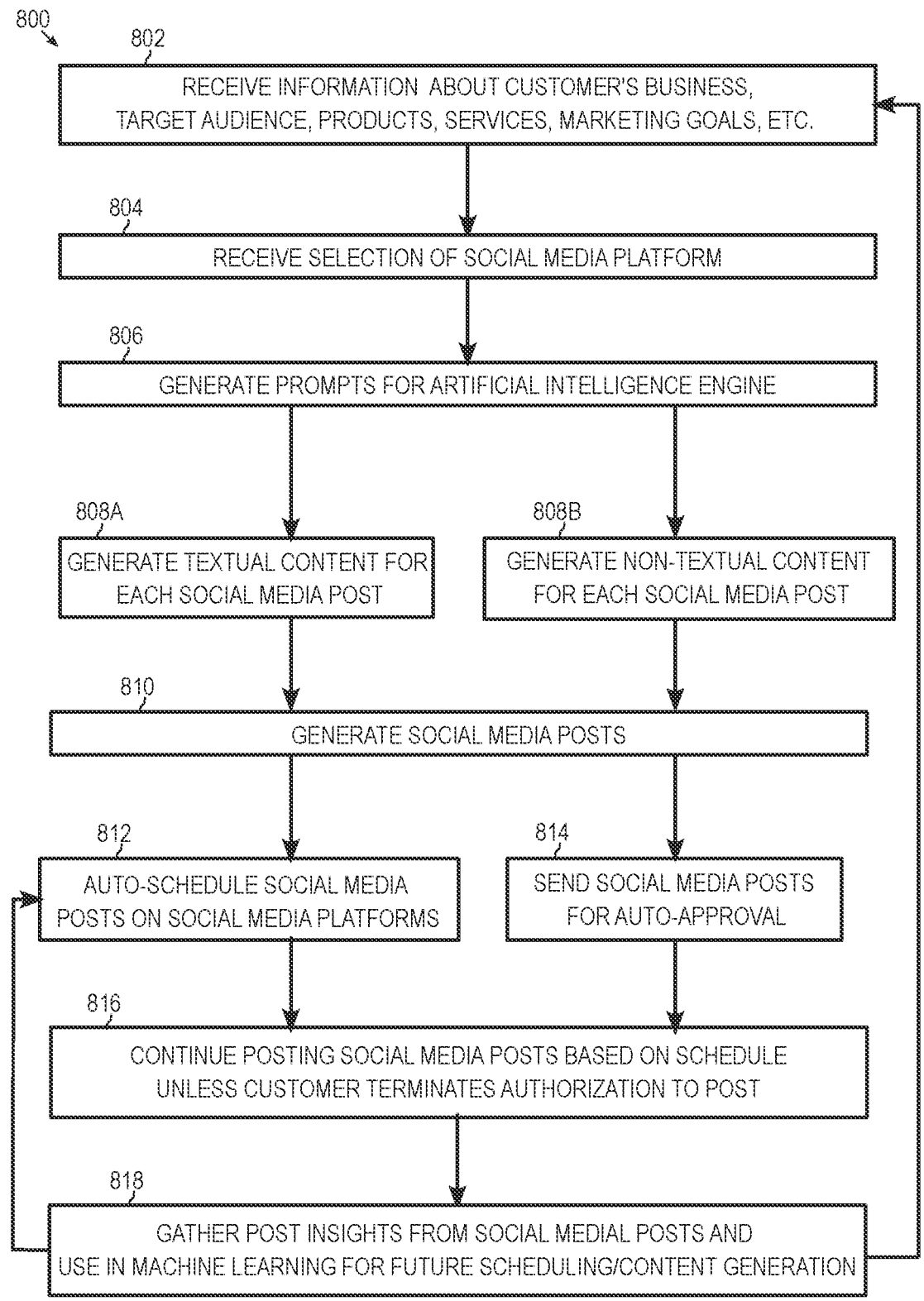
FIG. 8 is a simplified flow diagram illustrating example operations associated with a system for automatically generating, scheduling, posting, and recycling social media posts using AI, according to some embodiments of the present disclosure.

FIG. 8 is a simplified flow diagram illustrating example operations 800 that may be associated with some embodiments of system 100. At 802, social planner tool 102 may receive information about a customer's (e.g., user 204) business, target audience, products, services, marketing goals, etc. The information may be obtained when user 204 enters it in data input module 206 of application interface 202. At 804, social planner tool 102 may receive a selection of a particular one 116a of social media platforms 116. The selection may be received when user 204 enters it in data input module 206 of application interface 202. At 806, social planner tool 102 may generate prompts 334 for AI engine 104. In some embodiments, prompt requestor 320 in social planner tool 102 may generate prompts 334 as follows: using seed data 224 provided by frontend 106, a request for prompts may be made to AI engine 104; in response, AI engine 104 may return a plurality of prompts 334.

In some embodiments, at 808a, social planner tool 102 may generate textual content for each one of social media posts 332, for example, by selecting one of prompts 334 and sending the selected one of prompts 334 to AI engine 104 with a request for textual content 336 tailored for a specific one 116a of social media platforms 116. Substantially simultaneously, social planner tool 102 may generate non-textual content 338 for each social media post 332, for example, by selecting one of prompts 334 and sending the selected one of prompts 334 to AI engine 104 with a request for non-textual content 338 tailored for the specific one 116a of social media platforms 116. At 810, social planner tool 102 may generate social media posts 332. At 812, social planner tool 102 may auto-schedule social media posts 332 on social media platforms 116 according to schedules 408.

At 814, social media posts 332 may be sent to frontend 106 for auto-approval. User 204 may be provided with a deadline to approve social media posts 332. In some embodiments, if approval is not received by the deadline, social media posts 332 are automatically approved. In some other embodiments, social media posts 332 may not be posted unless user 204 approves the posting. At 816, social planner tool 102 may continue posting social media posts 332 based on schedule 408 and recycle schedule 504 unless customer (e.g., user 204) terminates authorization to post. At 818, social planner tool 102 may gather post insights 344 from social media posts 332 and may use post insights 344 in machine learning (e.g., by learning module 346) for future content generation.

In some embodiments, the operations may revert thereafter to 812 and repeat until user 204 terminates authorization to post social media posts 332. In some other embodiments, the operations may revert to 802 and continue thereafter until user 204 terminates authorization to post social media posts 332.

Figure 9A:
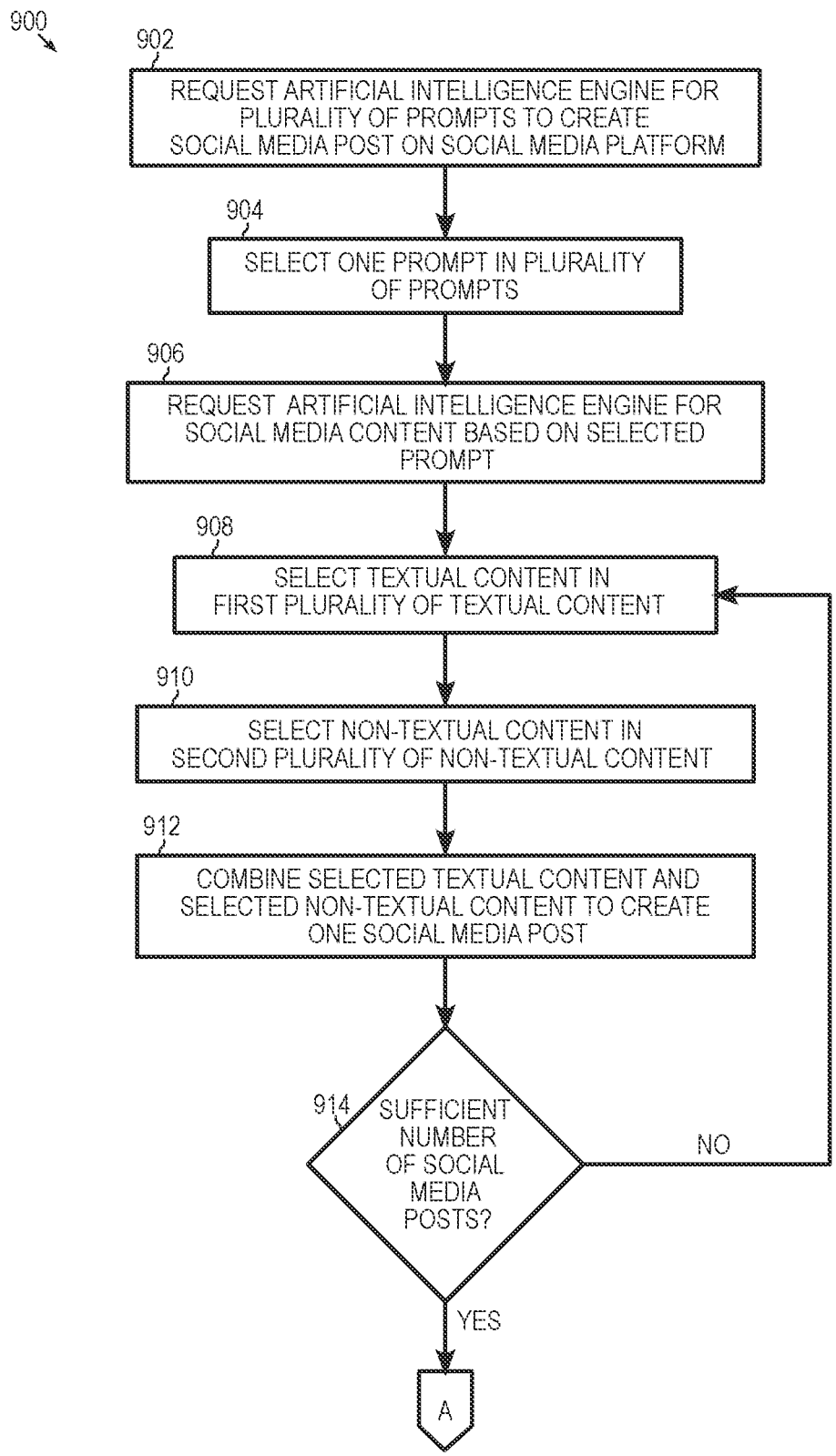
FIGS. 9A-9B are simplified flow diagrams illustrating other example operations associated with a system for automatically generating, scheduling, posting, and recycling social media posts using AI, according to some embodiments of the present disclosure.

FIG. 9 is a simplified flow diagram illustrating example operations 900 that may be associated with some embodiments of system 100. At 902, social planner tool 102 may request AI engine 104 for plurality of prompts 334 to create social media post 332a on social media platform 116a. At 904, one of plurality of prompts 334 may be selected. At 906, social planner tool 102 may request AI engine 104 for social media content (e.g., first plurality of textual content 336 and second plurality of non-textual content 338) based on the selected one of prompts 334. At 908, one of textual content 336a may be selected from the first plurality of textual content 336. At 910, one or more of non-textual content 338a may be selected from the second plurality of non-textual content 338. At 912, selected textual content 336a and selected non-textual content 338a may be combined to create social media post 332a.

Figure 9B:
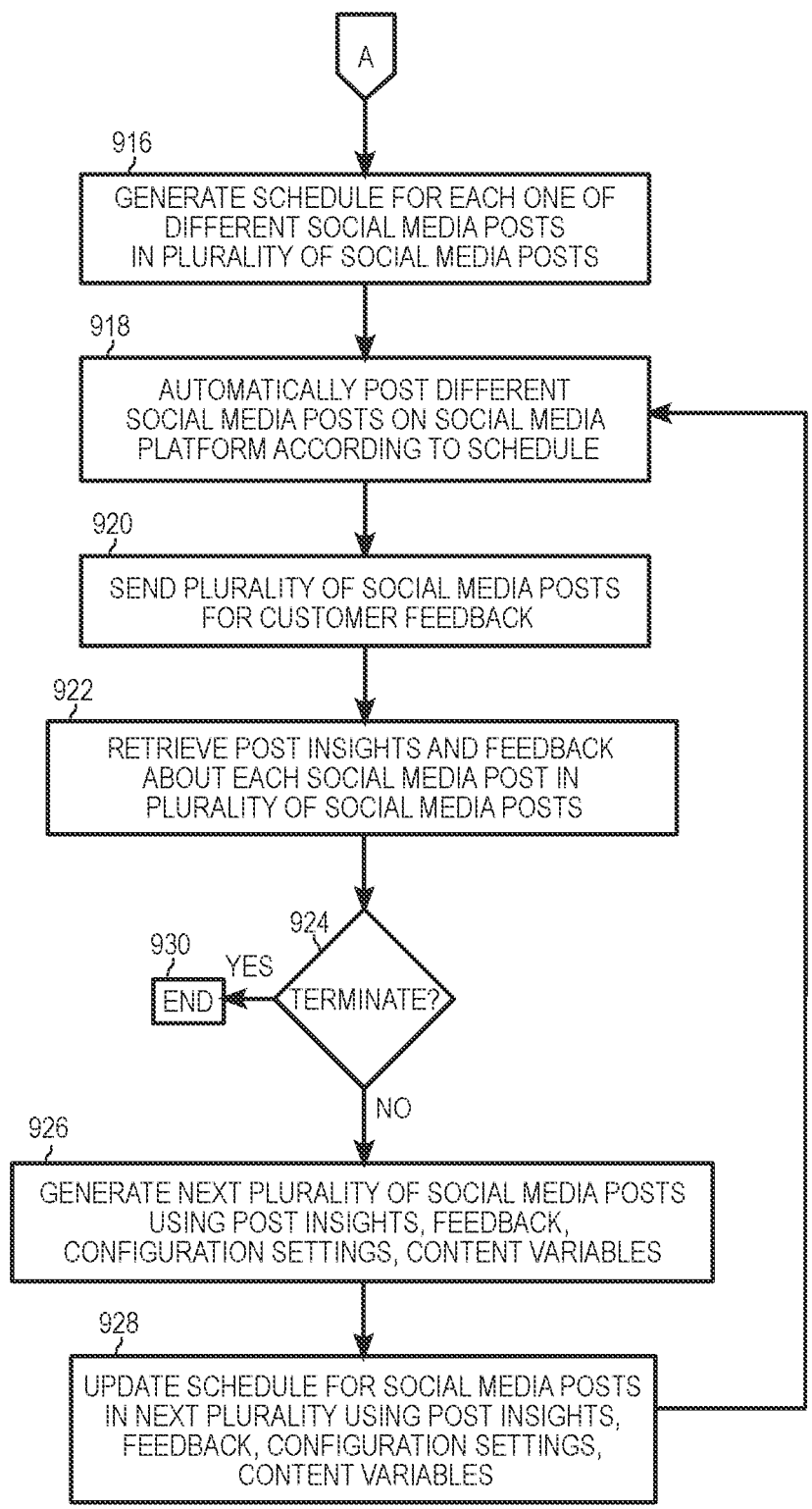

At 914, a determination may be made whether sufficient number of social media posts 332 have been generated. If not, the operations revert to 908, and continued thereafter until a first plurality of social media posts 332 (e.g., batch 334a) has been generated. If sufficient number of social media posts 332 have been generated at 914, the operations step to 916 as shown in FIG. 9B. At 916, schedule 408 for each one of different social media posts 332 in plurality of social media posts 332 may be generated. At 920, social planner tool 102 may send plurality of social media posts 332 for customer feedback (e.g., from user 204). At 922, social planner tool 102 may retrieve post insights 344 and feedback 220 about social media post 332a in plurality of social media posts 332.

At 924, a determination may be made whether to terminate posting social media posts 332. If not, the operations may step to 926, at which a next plurality of social media posts (e.g., batch 334b) may be generated, for example, by updating social media posts 332 in the first plurality (e.g., batch 334a) using post insights 344, feedback 220, content variables 342, and/or configuration settings 222. At 928, schedule 408 for social media posts 332 in the updated plurality (e.g., batch 334b) may be updated using one or more of post insights 344, content variables 342, feedback 220 and configuration settings 222. Thereafter, the operations may revert to operation 918 and continue thereafter, repeating until the determination is made at 924 to terminate posting of social media posts 332.

Figure 10:
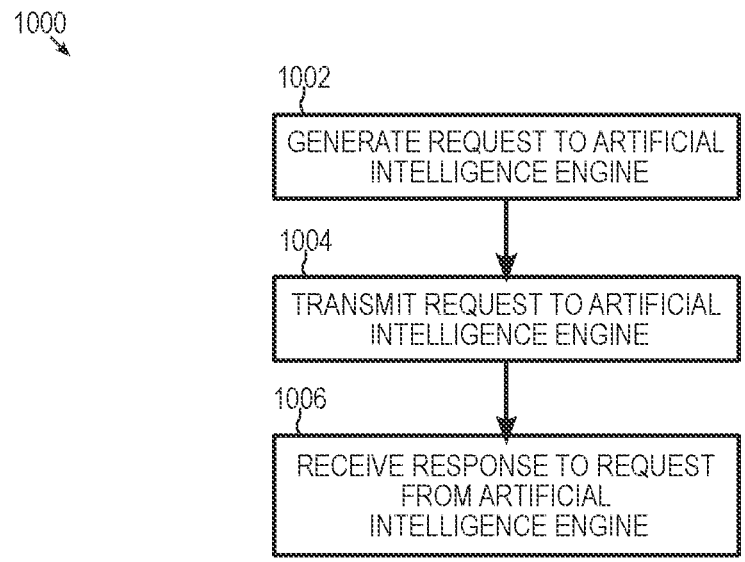
FIG. 10 is a simplified flow diagram illustrating yet other example operations associated with a system for automatically generating, scheduling, posting, and recycling social media posts using AI, according to some embodiments of the present disclosure.

FIG. 10 is a simplified block diagram illustrating example operations 1000 that may be associated with social planner tool 102 of system 100. At 1002, a request may be generated by social planner tool 102 to AI engine 104. The request may be to generate prompts 334 using seed data 224, or to generate textual content 336 using a selected one of prompts 334, or to generate non-textual content 338 using the selected one of prompts 334. At 1004, the request may be transmitted to AI engine 104, for example, through cloud network 120. The request may be transmitted through AI interface 310. At 1008, a response to the request may be received from AI engine 104. The response may include prompts 334, or textual content 336 or non-textual content 338 as applicable.

FIG. 11 is a simplified block diagram illustrating example operations 1100 that may be associated with social planner tool 102 of system 100. At 1102, one of social media posts 332, for example, 332a, may be posted on one of social media platforms 116, for example, 116a. At 1104, post insights 344 may be received from social media platform 116a. At 1106, another social media post 332b or associated schedule 408 may be modified based on post insights 344.

Although FIGS. 8-11 illustrate various operations performed in a particular order, this is simply illustrative, and the operations discussed herein may be reordered and/or repeated as suitable. Further, additional operations which are not illustrated may also be performed without departing from the scope of the present disclosure. Also, various ones of the operations discussed herein with respect to FIGS. 8-11 may be modified in accordance with the present disclosure to generate, post, schedule and recycle social media posts 332 as disclosed herein. Although various operations are illustrated in FIGS. 8-11 once each, the operations may be repeated as often as desired. For example, operations 902 to 928 in FIGS. 9A-9B may be repeated for different social media platforms 116 as desired and based on particular needs.

SELECT EXAMPLES

Example 1 provides a method for automatically generating, scheduling, posting, and recycling social media posts, the method comprising: requesting an artificial intelligence (AI) engine for a plurality of prompts to create a social media post on a social media platform; selecting one prompt in the plurality of prompts returned by the AI engine; requesting the AI engine for social media post content based on the selected prompt, the social media post content comprising a first plurality of textual content and a second plurality of non-textual content; selecting a textual content in the first plurality of textual content returned by the AI engine; selecting a non-textual content in the second plurality of non-textual content returned by the AI engine, the non-textual content selected to semantically match the selected textual content; generating the social media post by combining the selected textual content and the selected non-textual content; generating a plurality of social media posts by repeating: (i) selecting the textual content, (ii) selecting the non-textual content, and (iii) combining the selected textual content and the selected non-textual content; generating a schedule for each one in the plurality of social media posts; and automatically posting each one in the plurality of social media posts on the social media platform according to the schedule.

Example 2 provides the method of example 1, in which requesting the AI engine for the plurality of prompts comprises providing to the AI engine, seed data indicative of at least (a) the social media platform for the social media posts, (b) a business niche targeted by the social media posts, and (c) a geographic location of an audience targeted by the social media posts, and the seed data is received from a frontend coupled to an application interface.

Example 3 provides the method of example 2, in which the seed data includes customer engagement rates and business needs for various days, configuration settings for the social media platform are derived based on the seed data, and the schedule is generated based on the configuration settings.

Example 4 provides the method of any one of examples 2-3, in which the seed data further includes specific dates and times for posting the social media posts, and the schedule includes the specific dates and times from the seed data.

Example 5 provides the method of any one of examples 1-4, in which the schedule is generated based at least on configuration settings and social media platform rules, the configuration settings include attributes specific to the social media platform, and the social media platform rules comprise rules for posting social media posts using the attributes.

Example 6 provides the method of any one of examples 1-5, in which the schedule includes a specific date and time when at least one in the plurality of social media posts is to be reposted on the social media platform, and the specific date and time are determined according to configuration settings for the social media platform.

Example 7 provides the method of example 6, in which the specific date and time are further determined according to social media platform rules.

Example 8 provides the method of any one of examples 1-7, further comprising: generating different social media posts for a plurality of social media platforms; generating respective schedules for the different social media posts on each one in the plurality of social media platforms; and automatically posting the plurality of social media posts on the corresponding social media platforms according to the respective schedules.

Example 9 provides the method of any one of examples 1-8, in which the plurality of social media posts is a first plurality, and the method further comprises: retrieving post insights about at least one social media post in the first plurality, the post insights comprising interactions with the at least one social media post by users on the corresponding social media platform; and generating a second plurality of social media posts by updating at least the one social media post in the first plurality according to the post insights.

Example 10 provides the method of example 9, in which individual social media posts in the first plurality are updated further by changing values of specific fields in the social media posts.

Example 11 provides the method of any one of examples 9-10, in which individual social media posts in the first plurality are updated further according to configuration settings for the social media platform.

Example 12 provides the method of any one of examples 9-11, in which the schedule is updated for the second plurality based on the post insights.

Example 13 provides the method of any one of examples 9-12, in which the post insights include at least one of: comments, likes, shares, and reposts depending on the social media platform.

Example 14 provides the method of any one of examples 1-13, in which communication with the AI engine is via an application programming interface (API) over a cloud network.

Example 15 provides the method of any one of examples 1-14, in which the AI engine comprises a natural language processing (NLP) module and an image processing module, the NLP module generates the first plurality of textual content, and the image processing module generates the non-textual content.

Example 16 provides the method of any one of examples 1-15, in which the textual content includes at least one of: bulk text, hashtags, and keywords.

Example 17 provides the method of any one of examples 1-16, in which the non-textual content includes at least one of: icons, animations, images, and video.

Example 18 provides the method of any one of examples 1-17, further comprising sending the plurality of social media posts to a frontend for feedback.

Example 19 provides the method of example 18, in which, responsive to the feedback, making a determination of at least one of: terminating the posting of the plurality of social media posts on the social media platform, continuing the posting of the plurality of social media posts on the social media platform, and modifying at least one in the plurality of social media posts before posting the at least one in the plurality of social media posts on the social media platform.

Example 20 provides non-transitory computer-readable tangible media that includes instructions for execution, which when executed by a processor of a computing device, is operable to perform operations comprising: requesting an artificial intelligence (AI) engine for a plurality of prompts to create a social media post on a social media platform; selecting one prompt in the plurality of prompts returned by the AI engine; requesting the AI engine for social media post content based on the selected prompt, the social media post content comprising a first plurality of textual content and a second plurality of non-textual content; selecting a textual content in the first plurality of textual content returned by the AI engine; selecting a non-textual content in the second plurality of non-textual content returned by the AI engine, the non-textual content selected to semantically match the selected textual content; generating the social media post by combining the selected textual content and the selected non-textual content; generating a plurality of social media posts by repeating: (i) selecting the textual content, (ii) selecting the non-textual content, and (iii) combining the selected textual content and the selected non-textual content; generating a schedule for each one in the plurality of social media posts; and automatically posting each one in the plurality of social media posts on the social media platform according to the schedule.

Example 21 provides the non-transitory computer-readable tangible media of example 20, in which requesting the AI engine for the plurality of prompts comprises providing to the AI engine, seed data indicative of at least (a) the social media platform for the social media post, (b) a business niche targeted by the social media post, and (c) a geographic location of an audience targeted by the social media post, and the seed data is received from a frontend coupled to an application interface.

Example 22 provides the non-transitory computer-readable tangible media of example 21, in which the seed data includes customer engagement rates and business needs for various days, configuration settings for the social media platform are derived based on the seed data, and the schedule is generated based at least on (i) the configuration settings, or (ii) social media rules of the social media platform.

Example 23 provides the non-transitory computer-readable tangible media of any one of examples 20-22, in which the schedule includes a specific date and time when at least one in the plurality of social media posts is reposted on the social media platform, and the specific date and time are determined according to at least one of: configuration settings for the social media platform and social media platform rules.

Example 24 provides the non-transitory computer-readable tangible media of any one of examples 20-23, the operations further comprising: creating different social media posts for a plurality of social media platforms; generating respective schedules for the different social media posts on each one in the plurality of social media platforms; and automatically posting the plurality of social media posts on the corresponding social media platforms according to the respective schedules.

Example 25 provides the non-transitory computer-readable tangible media of any one of examples 20-24, in which the plurality of social media posts is a first plurality, and the operations further comprise: retrieving post insights about at least one social media post in the first plurality, the post insights comprising interactions with the at least one social media post by users on the corresponding social media platform; and generating a second plurality of social media posts by updating at least the one social media post in the first plurality according to the post insights.

Example 26 provides an apparatus comprising: a processing circuitry; a memory storing data; and a communication circuitry, in which the processing circuitry executes instructions associated with the data, the processing circuitry is coupled to the communication circuitry and the memory, and the processing circuitry and the memory cooperate, such that the apparatus is configured for: requesting an artificial intelligence (AI) engine for a plurality of prompts to create a social media post on a social media platform; selecting one prompt in the plurality of prompts returned by the AI engine; requesting the AI engine for social media post content based on the selected prompt, the social media post content comprising a first plurality of textual content and a second plurality of non-textual content; selecting a textual content in the first plurality of textual content returned by the AI engine; selecting a non-textual content in the second plurality of non-textual content returned by the AI engine, the non-textual content selected to semantically match the selected textual content; generating the social media post by combining the selected textual content and the selected non-textual content; generating a plurality of social media posts by repeating: (i) selecting the textual content, (ii) selecting the non-textual content, and (iii) combining the selected textual content and the selected non-textual content; generating a schedule for each one in the plurality of social media posts; and automatically posting each one in the plurality of social media posts on the social media platform according to the schedule.

Example 27 provides the apparatus of example 26, in which requesting the AI engine for the plurality of prompts comprises providing to the AI engine, seed data indicative of at least (a) the social media platform for the social media post, (b) a business niche targeted by the social media post, and (c) a geographic location of an audience targeted by the social media post, and the seed data is received from a frontend coupled to an application interface.

Example 28 provides the apparatus of example 27, in which the seed data includes customer engagement rates and business needs for various days, configuration settings for the social media platform are derived based on the seed data, and the schedule is generated based at least on (i) the configuration settings, or (ii) social media rules of the social media platform.

Example 29 provides the apparatus of any one of examples 26-28, in which the schedule includes a specific date and time when at least one in the plurality of social media posts is reposted on the social media platform, and the specific date and time are determined according to at least one of: configuration settings for the social media platform and social media platform rules.

Example 30 provides the apparatus of any one of examples 26-29, in which the apparatus is further configured for: creating different social media posts for a plurality of social media platforms, generating respective schedules for the different social media posts on each one in the plurality of social media platforms, and automatically posting the plurality of social media posts on the corresponding social media platforms according to the respective schedules.

Example 31 provides the apparatus of any one of examples 26-30, in which the plurality of social media posts is a first plurality of social media posts, and the apparatus is further configured for: retrieving post insights about each social media post in the first plurality of social media posts, the post insights comprising interactions by users on the social media platform with respective social media posts in the first plurality of social media posts; and generating a second plurality of social media posts by updating each social media post in the first plurality of social media posts according to at least one of: (i) the post insights, (ii) content variables comprising variations of variations in values of specific fields in the social media posts, and (ii) configuration settings for the social media platform.

Example 32 provides a method for automatically generating, scheduling, posting, and recycling social media posts, the method comprising: generating a first request to an artificial intelligence (AI) engine for a plurality of prompts to create a social media post on a social media platform, the first request based on seed data received from a web browser, the seed data indicative of a business niche targeted by the social media post; selecting one prompt in the plurality of prompts returned by the AI engine; generating a second request to the AI engine for a plurality of textual content, the second request based on the selected prompt; selecting a textual content in the plurality of textual content returned by the AI engine; generating a third request to the AI engine for a plurality of non-textual content, the third request based on the selected textual content; selecting a non-textual content in the plurality of non-textual content returned by the AI engine; combining the selected textual content and the selected non-textual content according to pre-configured settings to create one social media post; generating a plurality of social media posts by repeating (i) selecting the textual content, (ii) generating the third request, (iii) selecting the non-textual content and (iv) combining the selected textual content and the selected non-textual content; generating a schedule for each one in the plurality of social media posts; and automatically posting each one in the plurality of social media posts on the social media platform according to the schedule.

Example 33 provides the method of example 32, further comprising repeating generating the plurality of social media posts for a plurality of social media platforms, in which each social media platform is associated with a separate plurality of prompts.

Example 34 provides the method of any one of examples 32-33, further comprising: transmitting, to the AI engine, the first request; receiving, from the AI engine, the plurality of prompts in response to the first request; transmitting, to the AI engine, the second request; receiving, from the AI engine, the plurality of textual content in response to the second request; transmitting, to the AI engine, the third request; and receiving, from the AI engine, the plurality of non-textual content in response to the third request.

Example 35 provides the method of any one of examples 32-34, further comprising: receiving post insights from the social media platform, the post insights indicative of user interactions with the social media posts; and modifying the schedule based on the post insights.

Example 36 provides the method of any one of examples 32-35, further comprising repeating posting of at least one of the social media posts based on configuration settings.

Example 37 provides non-transitory computer-readable tangible media that includes instructions for execution, which when executed by a processor of a computing device, is operable to perform operations comprising: generating a first request to an artificial intelligence (AI) engine for a plurality of prompts to create a social media post on a social media platform, the first request based on seed data received from a web browser, the seed data indicative of a business niche targeted by the social media post; selecting one prompt in the plurality of prompts returned by the AI engine; generating a second request to the AI engine for a plurality of textual content, the second request based on the selected prompt; selecting a textual content in the plurality of textual content returned by the AI engine; generating a third request to the AI engine for a plurality of non-textual content, the third request based on the selected textual content; selecting a non-textual content in the plurality of non-textual content returned by the AI engine; combining the selected textual content and the selected non-textual content according to pre-configured settings to create one social media post; generating a plurality of social media posts by repeating (i) selecting the textual content, (ii) generating the third request, (iii) selecting the non-textual content and (iv) combining the selected textual content and the selected non-textual content; generating a schedule for each one in the plurality of social media posts; and automatically posting each one in the plurality of social media posts on the social media platform according to the schedule.

Example 38 provides the non-transitory computer-readable tangible media of example 37, the operations further comprising repeating generating the plurality of social media posts for a plurality of social media platforms, in which each social media platform is associated with a separate plurality of prompts.

Example 39 provides the non-transitory computer-readable tangible media of any one of examples 37-38, the operations further comprising: transmitting, to the AI engine, the first request; receiving, from the AI engine, the plurality of prompts in response to the first request; transmitting, to the AI engine, the second request; receiving, from the AI engine, the plurality of textual content in response to the second request; transmitting, to the AI engine, the third request; and receiving, from the AI engine, the plurality of non-textual content in response to the third request.

Example 40 provides the non-transitory computer-readable tangible media of any one of examples 37-39, the operations further comprising: receiving post insights from the social media platform, the post insights indicative of user interactions with the social media posts; and modifying the schedule based on the post insights.

Example 41 provides the non-transitory computer-readable tangible media of any one of examples 37-40, the operations further comprising repeating posting of at least one of the social media posts based on configuration settings.

Example 42 provides an apparatus comprising: a processing circuitry; a memory storing data; and a communication circuitry, in which the processing circuitry executes instructions associated with the data, the processing circuitry is coupled to the communication circuitry and the memory, and the processing circuitry and the memory cooperate, such that the apparatus is configured for: generating a first request to an artificial intelligence (AI) engine for a plurality of prompts to create a social media post on a social media platform, the first request based on seed data received from a web browser, the seed data indicative of a business niche targeted by the social media post; selecting one prompt in the plurality of prompts returned by the AI engine; generating a second request to the AI engine for a plurality of textual content, the second request based on the selected prompt; selecting a textual content in the plurality of textual content returned by the AI engine; generating a third request to the AI engine for a plurality of non-textual content, the third request based on the selected textual content; selecting a non-textual content in the plurality of non-textual content returned by the AI engine; combining the selected textual content and the selected non-textual content according to pre-configured settings to create one social media post; generating a plurality of social media posts by repeating (i) selecting the textual content, (ii) generating the third request, (iii) selecting the non-textual content and (iv) combining the selected textual content and the selected non-textual content; generating a schedule for each one in the plurality of social media posts; and automatically posting each one in the plurality of social media posts on the social media platform according to the schedule.

Example 43 provides the apparatus of example 42, in which the apparatus is further configured for repeating generating the plurality of social media posts for a plurality of social media platforms, in which each social media platform is associated with a separate plurality of prompts.

Example 44 provides the apparatus of any one of examples 42-43, in which the apparatus is further configured for: transmitting, to the AI engine, the first request; receiving, from the AI engine, the plurality of prompts in response to the first request; transmitting, to the AI engine, the second request; receiving, from the AI engine, the plurality of textual content in response to the second request; transmitting, to the AI engine, the third request; and receiving, from the AI engine, the plurality of non-textual content in response to the third request.

Example 45 provides the apparatus of any one of examples 42-44, in which the apparatus is further configured for: receiving post insights from the social media platform, the post insights indicative of user interactions with the social media posts; and modifying the schedule based on the post insights.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A method for automatically generating, scheduling, posting, and recycling social media posts, the method comprising:

requesting an artificial intelligence (AI) engine for a plurality of prompts to create a social media post on a social media platform;
selecting one prompt in the plurality of prompts returned by the AI engine;
requesting the AI engine for social media post content based on the selected prompt, the social media post content comprising a first plurality of textual content and a second plurality of non-textual content;
selecting a textual content in the first plurality of textual content returned by the AI engine;
selecting a non-textual content in the second plurality of non-textual content returned by the AI engine, the non-textual content selected to semantically match the selected textual content;
generating the social media post by combining the selected textual content and the selected non-textual content;
generating a plurality of social media posts by repeating: (i) selecting the textual content returned by the AI engine, (ii) selecting the non-textual content returned by the AI engine, and (iii) combining the selected textual content and the selected non-textual content;
generating a schedule for each one in the plurality of social media posts;
automatically posting each one in the plurality of social media posts on the social media platform according to the schedule;
modifying the schedule and the plurality of social media posts according to learning by the AI engine from at least post insights received for the posted social media posts; and
automatically posting each one in the modified plurality of social media posts on the social media platform according to the modified schedule.

2. The method of claim 1, wherein:
requesting the AI engine for the plurality of prompts comprises providing to the AI engine, seed data indicative of at least (a) the social media platform for the social media posts, (b) a business niche targeted by the social media posts, and (c) a geographic location of an audience targeted by the social media posts, and
the seed data is received from a frontend coupled to an application interface.

3. The method of claim 2, wherein:
the seed data includes customer engagement rates and business needs for various days,
configuration settings for the social media platform are derived based on the seed data, and
the schedule is generated based on the configuration settings.

4. The method of claim 1, wherein:
the schedule is generated based at least on configuration settings and social media platform rules,
the configuration settings include attributes specific to the social media platform, and
the social media platform rules comprise rules for posting social media posts using the attributes.

5. The method of claim 1, wherein:
the schedule includes a specific date and time when at least one in the plurality of social media posts is to be reposted on the social media platform, and
the specific date and time are determined according to configuration settings for the social media platform.

6. The method of claim 1, further comprising:
generating different social media posts for a plurality of social media platforms;
generating respective schedules for the different social media posts on each one in the plurality of social media platforms; and
automatically posting the plurality of social media posts on the corresponding social media platforms according to the respective schedules.

7. The method of claim 1, wherein:
the plurality of social media posts is a first plurality,
the modified plurality of social media posts is a second plurality, the post insights comprise interactions with at least one social media post in the first plurality by users on the corresponding social media platform, and
the second plurality of social media posts comprises an updated version of the at least the one social media post according to the post insights.

8. The method of claim 1, wherein:
the AI engine comprises a natural language processing (NLP) module and an image processing module,
the NLP module generates the first plurality of textual content, and
the image processing module generates the non-textual content.

9. The method of claim 1, further comprising sending the plurality of social media posts to a frontend for feedback.

10. The method of claim 9, wherein, responsive to the feedback, making a determination of at least one of:
terminating the posting of the plurality of social media posts on the social media platform,
continuing the posting of the plurality of social media posts on the social media platform, and
modifying at least one in the plurality of social media posts before posting the at least one in the plurality of social media posts on the social media platform.

11. Non-transitory computer-readable tangible media that includes instructions for execution, which when executed by a processor of a computing device, is operable to perform operations comprising:
requesting an artificial intelligence (AI) engine for a plurality of prompts to create a social media post on a social media platform;
selecting one prompt in the plurality of prompts returned by the AI engine;
requesting the AI engine for social media post content based on the selected prompt, the social media post content comprising a first plurality of textual content and a second plurality of non-textual content;
selecting a textual content in the first plurality of textual content returned by the AI engine;
selecting a non-textual content in the second plurality of non-textual content returned by the AI engine, the non-textual content selected to semantically match the selected textual content;
generating the social media post by combining the selected textual content and the selected non-textual content;
generating a plurality of social media posts by repeating: (i) selecting the textual content returned by the AI engine, (ii) selecting the non-textual content returned by the AI engine, and (iii) combining the selected textual content and the selected non-textual content;
generating a schedule for each one in the plurality of social media posts;
automatically posting each one in the plurality of social media posts on the social media platform according to the schedule;

modifying the schedule and the plurality of social media posts according to learning by the AI engine from at least post insights received for the posted social media posts; and automatically posting each one in the modified plurality of social media posts on the social media platform according to the modified schedule.

12. The non-transitory computer-readable tangible media of claim 11, wherein requesting the AI engine for the plurality of prompts comprises providing to the AI engine, seed data indicative of at least (a) the social media platform for the social media post, (b) a business niche targeted by the social media post, and (c) a geographic location of an audience targeted by the social media post, and the seed data is received from a frontend coupled to an application interface.

13. The non-transitory computer-readable tangible media of claim 12, wherein:

the seed data includes customer engagement rates and business needs for various days, configuration settings for the social media platform are derived based on the seed data, and the schedule is generated based at least on (i) the configuration settings, or (ii) social media rules of the social media platform.

14. The non-transitory computer-readable tangible media of claim 11, the operations further comprising:

creating different social media posts for a plurality of social media platforms;

generating respective schedules for the different social media posts on each one in the plurality of social media platforms; and automatically posting the plurality of social media posts on the corresponding social media platforms according to the respective schedules.

15. The non-transitory computer-readable tangible media of claim 11, wherein:

the plurality of social media posts is a first plurality, the modified plurality of social media posts is a second plurality, the post insights comprise interactions with at least one social media post in the first plurality by users on the corresponding social media platform, and the second plurality of social media posts comprises an updated version of the at least the one social media post according to the post insights.

16. An apparatus comprising:

a processing circuitry;

a memory storing data; and a communication circuitry, wherein the processing circuitry executes instructions associated with the data, the processing circuitry is coupled to the communication circuitry and the memory, and the processing circuitry and the memory cooperate, such that the apparatus is configured for:

requesting an artificial intelligence (AI) engine for a plurality of prompts to create a social media post on a social media platform;

selecting one prompt in the plurality of prompts returned by the AI engine;

requesting the AI engine for social media post content based on the selected prompt, the social media post content comprising a first plurality of textual content and a second plurality of non-textual content;

selecting a textual content in the first plurality of textual content returned by the AI engine;

selecting a non-textual content in the second plurality of non-textual content returned by the AI engine, the non-textual content selected to semantically match the selected textual content;

generating the social media post by combining the selected textual content and the selected non-textual content;

generating a plurality of social media posts by repeating: (i) selecting the textual content returned by the AI engine, (ii) selecting the non-textual content returned by the AI engine, and (iii) combining the selected textual content and the selected non-textual content;

generating a schedule for each one in the plurality of social media posts;

automatically posting each one in the plurality of social media posts on the social media platform according to the schedule;

modifying the schedule and the plurality of social media posts according to learning by the AI engine from at least post insights received for the posted social media posts; and automatically posting each one in the modified plurality of social media posts on the social media platform according to the modified schedule.

17. The apparatus of claim 16, wherein requesting the AI engine for the plurality of prompts comprises providing to the AI engine, seed data indicative of at least (a) the social media platform for the social media post, (b) a business niche targeted by the social media post, and (c) a geographic location of an audience targeted by the social media post, and the seed data is received from a frontend coupled to an application interface.

18. The apparatus of claim 17, wherein:

the seed data includes customer engagement rates and business needs for various days, configuration settings for the social media platform are derived based on the seed data, and the schedule is generated based at least on (i) the configuration settings, or (ii) social media rules of the social media platform.

19. The apparatus of claim 16, wherein the apparatus is further configured for:

creating different social media posts for a plurality of social media platforms, generating respective schedules for the different social media posts on each one in the plurality of social media platforms, and automatically posting the plurality of social media posts on the corresponding social media platforms according to the respective schedules.

20. The apparatus of claim 16, wherein:

the plurality of social media posts is a first plurality of social media posts, the modified plurality of social media posts is a second plurality, the post insights comprise interactions with at least one social media post in the first plurality by users on the corresponding social media platform, and the second plurality of social media posts comprises an updated version of each social media post in the first plurality of social media posts according to at least one of: (i) the post insights, (ii) content variables comprising variations of variations in values of specific fields in the social media posts, and (ii) configuration settings for the social media platform.

* * * * *